US012477392B2

(12) United States Patent
Seshadri et al.

(10) Patent No.: US 12,477,392 B2
(45) Date of Patent: Nov. 18, 2025

(54) PULSE-SHAPING FILTERS FOR IMPROVING THE SPECTRAL EFFICIENCY OF BROADBAND SATELLITE SYSTEMS

(71) Applicant: Hughes Network Systems, LLC, Germantown, MD (US)

(72) Inventors: Rohit Iyer Seshadri, Gaithersburg, MD (US); Bassel F. Beidas, Alexandria, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 398 days.

(21) Appl. No.: 18/148,565

(22) Filed: Dec. 30, 2022

(65) Prior Publication Data

US 2024/0224116 A1     Jul. 4, 2024

(51) Int. Cl.
| | |
|---|---|
| H04W 28/06 | (2009.01) |
| H03M 7/02 | (2006.01) |
| H04B 7/185 | (2006.01) |
| H04L 1/00 | (2006.01) |
| H04L 25/03 | (2006.01) |

(52) U.S. Cl.
CPC ............ H04W 28/06 (2013.01); H03M 7/02 (2013.01); H04B 7/18513 (2013.01); H04L 1/0061 (2013.01); H04L 25/03834 (2013.01)

(58) Field of Classification Search
CPC .... H04W 28/06; H04B 7/0061; H04L 1/0061; H04L 25/03834
See application file for complete search history.

(56) References Cited

U.S. PATENT DOCUMENTS

2017/0207934 A1*  7/2017  Seshadri ........... H04L 25/03165

OTHER PUBLICATIONS

Application No. PCT/US2023/082458, International Search Report and Written Opinion, Mailed On Mar. 27, 2024, 11 pages.
Sahin et al., "A Survey on Multicarrier Communications: Prototype Filters, Lattice Structures, and Implementation Aspects", Institute of Electrical and Electronics Engineers Communications Surveys & Tutorials, vol. 16, No. 3, Jul. 1, 2014, pp. 1312-1338.

* cited by examiner

*Primary Examiner* — Brenda H Pham
(74) *Attorney, Agent, or Firm* — Kilpatrick Townsend & Stockton LLP

(57) ABSTRACT

Systems and methods are described for generating and implementing pulse-shaping filters for efficient utilization of limited spectral resources in wireless communication systems. Wireless communication systems operating at high spectral efficiency conventionally use pulse shaping filters that rely on Nyquist waveforms for good main lobe performance with low inter-symbol interference (ISI) power. Conventional uses of non-Nyquist waveforms typically involve an orthogonalization process to convert those non-Nyquist waveforms to Nyquist waveforms for ISI free performance. Embodiments of pulse shaping filters described herein generate a non-Nyquist partial response (NNPR) transmit filter and/or matched receive filter based on applying a tunable second-weighted orthogonalization to a tunable first-weighted non-Nyquist waveform to obtain a pulse-shaping waveform with parametric control over throughput and power penalty.

18 Claims, 16 Drawing Sheets
(4 of 16 Drawing Sheet(s) Filed in Color)

PULSE-SHAPING FILTERS FOR IMPROVING THE SPECTRAL EFFICIENCY OF BROADBAND SATELLITE SYSTEMS

BACKGROUND

There has been an increasing demand for more and faster broadband access, which has increasingly congested available radio frequency (RF) spectrum allocations. This has driven a desire for increasingly efficient utilization of available bandwidth resources. A common approach to efficiently utilize spectrum, particularly in state-of-the-art satellite communication systems, has been to use digital baseband Nyquist-based pulse shaping filters at the transmitter side of the communication channel. Such filters not only better contain the transmitted signal within the available spectrum, but also tend to minimize interference to signals occupying neighboring spectral bands. At the receiver side of the channel, a baseband filter, known as a matched filter, can be employed with characteristics derived from (e.g., matching those of) the pulse shaping filter at the transmitter. Such a pair of filters can tend to maximize the signal-to-noise ratio (SNR) at the receiver, thereby improving link reliability. For example, a root-raised cosine (RRC) filter is a well-known conventional choice for pulse shaping and matched filtering and has been integrated into widely adopted standards, such as the Digital Video Broadcasting System version 2 (DVB-S2) standards and second-generation satellite extensions thereto (DVB-S2X).

SUMMARY

Embodiments described herein includes systems and methods for generating and implementing novel pulse-shaping filters for efficient utilization of limited spectral resources in wireless communication systems, such as broadband satellite systems. Wireless communication systems operating at high spectral efficiency typically use pulse shaping filters that rely on Nyquist waveforms, such as sinusoidal waveforms, to produce good main lobe performance with low inter-symbol interference (ISI) power. To the extent that non-Nyquist (e.g., Gaussian) waveforms are used, conventional filters perform an orthogonalization process to convert those non-Nyquist waveforms to Nyquist waveforms for use in pulse shaping by the filter, thereby substantially eliminating ISI contributions to channel noise. Embodiments of pulse shaping filters described herein generate a non-Nyquist partial response (NNPR) transmit filter and matched receive filter based on applying a tunable second-weighted orthogonalization to a tunable first-weighted non-Nyquist waveform to obtain a pulse-shaping waveform with parametric control over throughput and power penalty.

According to a set of embodiments, a system is provided for communicating a data signal in a wireless communication network. The system includes a transmitter to transmit a pulse-shaped signal over a wireless channel of the wireless communication system. The transmitter has: a front-end configured to convert a stream of information bits to a sequence of symbols and to modulate the sequence of symbols onto a data signal; and a non-Nyquist partial response (NNPR) filter configured to pulse-shape the data signal with a non-Nyquist pulse-shaping waveform to generate the pulse-shaped signal, wherein the non-Nyquist pulse-shaping waveform is generated by weighting a non-Nyquist waveform as a function of a first tunable weighting factor to generate a weighted non-Nyquist waveform, and wherein the non-Nyquist pulse-shaping waveform is generated by applying weighted orthogonalization to the weighted non-Nyquist waveform as a function of a second tunable weighting factor, the second tunable weighting factor controlling a non-zero amount of inter-symbol interference ISI in the non-Nyquist pulse-shaping waveform.

According to another set of embodiments, a method is provided for communicating a data signal in a wireless communication network. The method includes: converting a stream of information bits to a sequence of symbols by a transmitter; modulating the sequence of symbols onto the data signal by the transmitter; pulse-shaping, by a non-Nyquist partial response (NNPR) filter of the transmitter, the data signal with a non-Nyquist pulse-shaping waveform to generate a pulse-shaped signal; and transmitting the pulse-shaped signal by the transmitter over a wireless channel of the wireless communication system. The non-Nyquist pulse-shaping waveform is generated by: weighting a non-Nyquist waveform as a function of a first tunable weighting factor to generate a weighted non-Nyquist waveform; and generating the non-Nyquist pulse-shaping waveform by applying weighted orthogonalization to the weighted non-Nyquist waveform as a function of a second tunable weighting factor, the second tunable weighting factor controlling a non-zero amount of inter-symbol interference ISI in the non-Nyquist pulse-shaping waveform.

According to another set of embodiments, a computational system is provided. The computational system incudes a set of processors and a non-transitory memory having instructions stored thereon, which, when executed, cause the set of processors to perform steps. The steps include: converting a stream of information bits to a sequence of symbols by a transmitter; modulating the sequence of symbols onto a data signal by the transmitter; and pulse-shaping, by a non-Nyquist partial response (NNPR) filter of the transmitter, the data signal with a non-Nyquist pulse-shaping waveform to generate a pulse-shaped signal, the non-Nyquist pulse-shaping waveform generated by: weighting a non-Nyquist waveform as a function of a first tunable weighting factor to generate a weighted non-Nyquist waveform; and generating the non-Nyquist pulse-shaping waveform by applying weighted orthogonalization to the weighted non-Nyquist waveform as a function of a second tunable weighting factor, the second tunable weighting factor controlling a non-zero amount of inter-symbol interference ISI in the non-Nyquist pulse-shaping waveform.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The patent or application file contains at least one drawing executed in color. Copies of this patent or patent application publication with color drawing(s) will be provided by the Office upon request and payment of the necessary fee.

DETAILED DESCRIPTION

Figure 1:
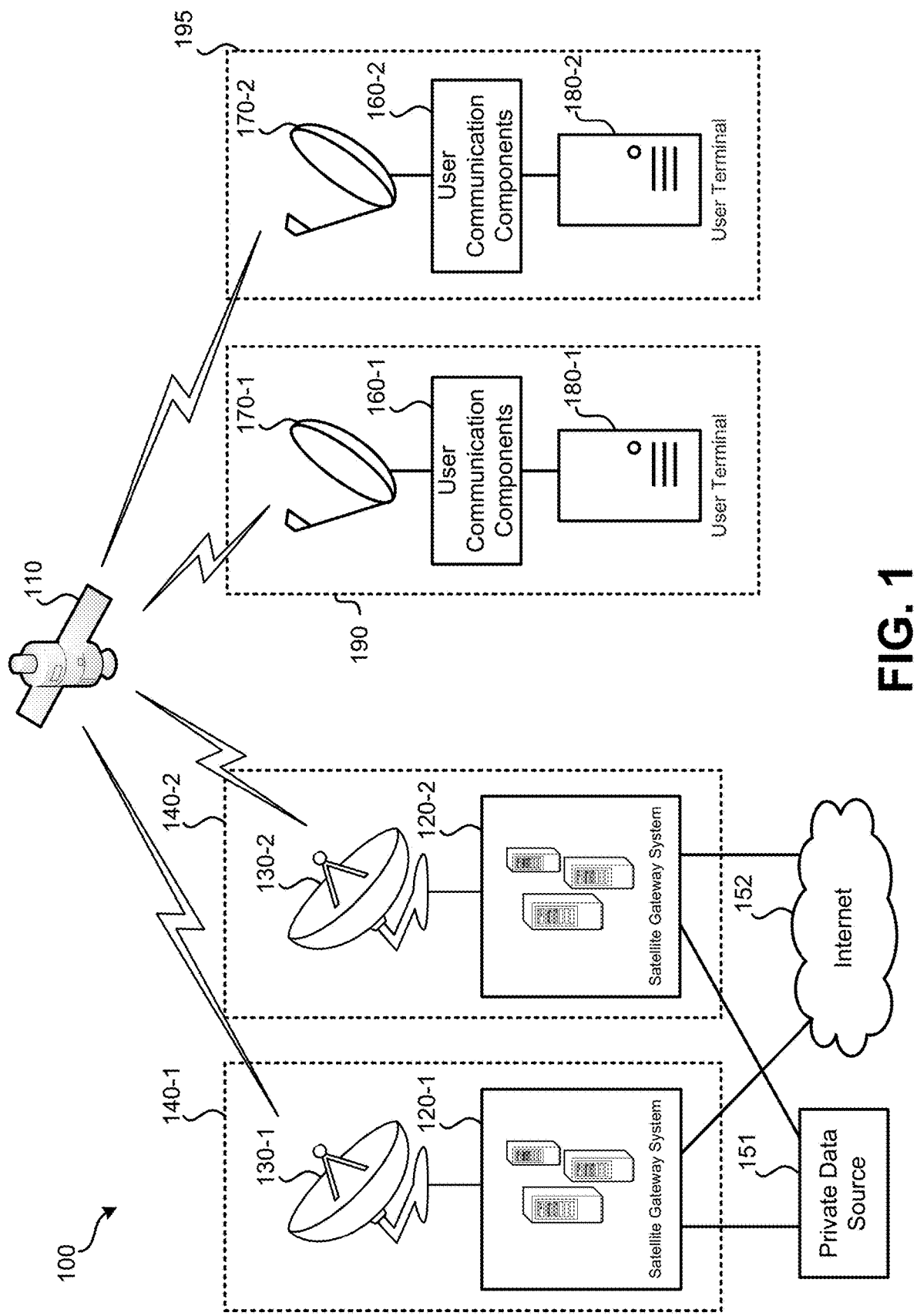
FIG. 1 illustrates an embodiment of a bidirectional satellite communication system as a context for embodiments described herein.

There has been an increasing demand for more and faster broadband access, which has increasingly congested available radio frequency (RF) spectrum allocations. This has driven a desire for increasingly efficient utilization of available bandwidth resources. A common conventional approach to efficiently utilize spectrum, particularly in state-of-the-art satellite communication systems, has been to use digital baseband pulse shaping filters at the transmitter side of the communication channel. Such filters not only better contain the transmitted signal within the available spectrum, but also tend to minimize interference to signals occupying neighboring spectral bands. At the receiver side of the channel, a baseband filter, known as a matched filter, can be employed with characteristics derived from (e.g., matching those of) the pulse shaping filter at the transmitter. Such a pair of filters can tend to maximize the signal-to-noise ratio (SNR) at the receiver, thereby improving link reliability. For example, a root-raised cosine (RRC) filter is a well-known conventional choice for pulse shaping and matched filtering and has been integrated into widely adopted standards, such as the Digital Video Broadcasting System version 2 (DVB-S2) standards and second-generation satellite extensions thereto (DVB-S2X).

An extensive amount of effort has been expended over time in relation to improving designs of pulse shaping transmit filters and/or matched receiver filter. In communication theory, the proposed approaches can be broadly classified into two categories. One category is Nyquist filter-pairs, which satisfy Nyquist's criterion for inter-symbol interference (ISI) free reception at the matched filter output. This ensures that in the absence of any additional impairments (e.g., multipath fading, amplifier nonlinearity, co-channel interference, etc.), the signal as received at the matched filter output and at the optimum sampling instant (e.g., typically at integer multiples of the symbol duration) is only affected by additive noise and is not impaired by previous and subsequent transmitted symbols. In general, use of Nyquist filter-pair approaches can effectively eliminate ISI concerns.

RRC filters are the most popular choice for Nyquist-based pulse shaping filters, not only due to their ease of implementation, but also because their time and frequency behavior can be described by a single-parameter, the "roll-off" factor. The signal bandwidth at the RRC filter output is a function of the symbol rate $R_s$ and roll-off $\alpha$ and is defined as $R_s(1+\alpha)$ Hz. This relationship yields an inference that a smaller $\alpha$ can provide better bandwidth utilization. However, reducing $\alpha$ can yield several disadvantages, such as an increase in transmitted signal peak-to-average power ratio (PAPR), larger spectral re-growth at the high-power amplifier (HPA) output of the transmitter, sensitivity to timing jitters at the receiver, and increased non-linear distortion at the matched filter output. Heuristic approaches have been proposed to design Nyquist filter pairs that can mitigate some of the drawbacks associated with smaller roll-offs. Often the Nyquist filter pairs, such as those used in RRC filters, are based on sinusoids. In some cases, Nyquist filter pairs are designed based on wavelet functions.

A second category of pulse shaping filters does not satisfy Nyquist's ISI free criterion. By introducing a certain amount of controlled ISI at the matched filter output, these designs can achieve improved spectral properties and lower PAPR relative to Nyquist-based filters. Some well-known examples in this category include continuous phase modulation and partial response signaling filters. Some approaches also use Faster-than-Nyquist (FtN) signaling to introduce controlled ISI at the receiver by increasing the transmission rates beyond those permitted by Nyquist's ISI free criterion. Receiver-based techniques, such as based on the soft-output Viterbi algorithm, or on soft-subtractive cancellation are typically employed to recover the information in presence of controlled ISI and other impairments, such as additive noise and amplifier nonlinearity.

As used herein, a Nyquist pulse-shaped signal generally uses any waveform having a spectrum that can be represented by (via Fourier transform) a rectangular function. A classic example of Nyquist waveforms is sinusoidal functions. A non-Nyquist pulse-shaping signal generally uses any time-limited waveform that is not a Nyquist waveform and that has a well-defined time and frequency representation. A classic example of non-Nyquist waveforms is Gaussian functions.

Embodiments described herein provide novel approaches to pulse shaping filters, referred to herein as non-Nyquist partial response (NNPR) filters. NNPR filters can improve bandwidth efficiency of state-of-the art wireless communication systems, such as satellite communication systems, in comparison to conventional RRC filters and other state-of-the-art filtering approaches. Embodiments also provide approaches to parametrically design such novel filters to optimize a trade-off between bandwidth efficiency and error rate performance. For example, a wireless communication network may be bandwidth- and power-limited; improvements to bandwidth efficiency often carry a power-related cost (e.g., a reduction in SNR), while improvements in power efficiency often carry a bandwidth cost (e.g., a reduction in spectral efficiency). NNPR approaches described herein largely retain compact time and frequency characteristics of non-Nyquist wavelets (e.g., a Gaussian wavelet), while facilitating improved control over ISI power at the receiver matched filter output.

Embodiments of NNPR filters described herein can provide several features over conventional RRC and other filtering approaches. One feature is an improvement in spectral characteristics. It is generally desirable for the power spectrum of a transmitted signal to have a compact main lobe and rapidly decaying side-lobes. A compact or narrow main lobe allows for more efficient use of the available spectrum. Rapidly decaying side-lobe (exhibiting rapid roll-off) helps to minimize interference to signals in neighboring bands, a phenomenon known as adjacent channel interference (ACI). Embodiments described herein can yield a more compact spectrum main lobe and smaller side-lobes than those of conventional RRC filters.

Another feature is that the novel NNPR filters described herein can provide higher symbol rates for a fixed channel bandwidth. As described below, embodiments described herein can be configured to pack more symbols per unit time into a given amount of bandwidth, as compared with conventional RRC filters. For example, adoption of such NNPR filters can increase throughput for satellite forward links operating on fixed transponder bandwidths. Another feature is that NNPR filters described herein can support tighter adjacent carrier spacing. As described below, embodiments described herein can be configured so that adjacent carriers are permitted to be spaced closer together with less resulting ACI, as compared to conventional RRC filters. For example, adoption of such NNPR filters can improve satellite return link spectral efficiency. Another feature is that NNPR filters described herein can support low peak-to-average power ratio (PAPR). For example, satellite systems use power amplifiers that typically are efficiently operated close to saturation. It can be desirable to use a low PAPR for the transmitted signal (after pulse shaping) to help reduce non-linear distortions that can be caused by the amplifier.

The novel NNPR filter approaches described herein can be generally applicable to improve spectral efficiency in any suitable type of wireless communication link. A wireless communication link can generally be described as having a transmitter in communication with a receiver via a wireless channel. For example, the transmitter converts a source bit stream into symbols, which are modulated onto a signal; the signal is transmitted over the wireless channel to the receiver; and the receiver demodulates the signal and converts the symbols back into an output bit stream that is estimated to match the source bit stream. Each of the transmitter, channel, and receiver impacts the signal. The wireless channel can include one or more air interfaces and one or more retransmitting components. Such wireless channels can be implemented in satellite networks, cellular networks, optical networks, and/or other networks. For example, in some satellite communication networks, the transmitter communicates the signal via a wireless uplink to a satellite, and payload components of the satellite (e.g., transponders and antennas) retransmit the signal via a wireless downlink to the receiver.

For added context, FIG. 1 illustrates an embodiment of a bidirectional satellite communication system 100 as a context for embodiments described herein. Bidirectional satellite communication system 100 may include: relay satellite 110; satellite gateway systems 120; bidirectional satellite communication links 130; private data source 151; user communication components 160; satellite antennas 170; and user terminals 180. Relay satellite 110 may be a bidirectional communication satellite that relays communications between satellite gateway systems 120 and user communication components 160. Therefore, via relay satellite 110, data may be transmitted from satellite gateway systems 120 to user communication components 160 and data may be transmitted from user communication components 160 to satellite gateway systems 120. Embodiments described herein focus on forward-link communications from the satellite gateway systems 120 to the user communication components 160 via the relay satellite 110. More specifically, embodiments described herein primarily focus on the downlink portion of the forward-link from the relay satellite 110 to the user communication components 160.

In some embodiments, system 100 may be used to provide user communication components 160 with Internet access (via Internet 152), and/or access to any other suitable public and/or private networks. Additionally or alternatively, system 100 may be used to provide user communication components 160 with access to private data source 151, which may be a private network, data source, or server system. In some architectures, satellite gateway systems 120 are in communication with backhaul infrastructure, terrestrial networks, and/or other communications infrastructure.

Relay satellite 110 may use different frequencies for communication with satellite gateway systems 120 than for communication with user communication components 160. Further, different frequencies may be used for uplink communications than for downlink communications. For example, different frequency bands, sub-bands, etc. can be used for some or all of forward uplink communications (satellite gateway system 120 to relay satellite 110), forward downlink communications (relay satellite 110 to user communication components 160), return uplink communications (user communication components 160 to relay satellite 110), and return downlink communications (relay satellite 110 to satellite gateway system 120).

Each satellite gateway system 120 is located at a respective geographic location 140. For example, satellite gateway system 120-1 communicates with relay satellite 110 using bidirectional satellite communication link 130-1, which can include one or more high-gain antennas that allow high data transmission rates between satellite gateway system 120-1 and relay satellite 110. Satellite gateway system 120-1 may receive data from and transmit data to many instances of user equipment, such as user communication components 160. Satellite gateway system 120-1 may encode data into a proper format for relaying by relay satellite 110. Similarly, satellite gateway system 120-1 may decode data received from various instances of user communication components 160 received via relay satellite 110.

Satellite gateway system 120-1 may serve as an intermediary between the satellite communication system and other data sources, such as private data source 151 and Internet 152. Satellite gateway system 121 may receive requests from user communication components 160 via relay satellite 110 for data accessible using Internet 152. Satellite gateway system 120-1 may retrieve such data from Internet 152 and transmit the retrieved data to the requesting instance of user equipment via relay satellite 110. Additionally, or alternatively, satellite gateway system 120-1 may receive requests from user communication components 160 via relay satellite 110 for data accessible in private data source 151. Satellite gateway system 120-1 may retrieve such data from private data source 151 and transmit the retrieved data to the requesting instance of user equipment via relay satellite 110.

Satellite gateway system 120-2 may function similarly to satellite gateway system 120-1 but may be located in a different physical location. While satellite gateway system 120-1 is located at geographic location 140-1, satellite gateway system 120-2 is located at geographic location 140-2. Co-located with satellite gateway system 120-2 may be bidirectional satellite communication link 130-2. Satellite gateway system 120-2 and bidirectional satellite communication link 130-2 may service a first group of user equipment while satellite gateway system 120-1 and bidirectional satellite communication link 130-1 may service another set of user equipment. Satellite gateway system 120-2 and bidirectional satellite communication link 130-2 may function similarly to satellite gateway system 120-1 and bidirectional satellite communication link 130-1, respectively.

Embodiments can use various techniques to mitigate interference between gateway systems 120. Some embodiments mitigate interference by geographic diversity. For example, geographic locations 140-1 and 140-2 may be separated by a significant enough distance such that the same frequencies can be used for uplink and downlink communications between bidirectional satellite communication links 130 and relay satellite 110 without a significant amount of interference occurring. Other embodiments use frequency diversity (e.g., multiple colors, such as different frequency bands or sub-bands) between adjacent gateway systems 120. Other embodiments use temporal diversity (e.g., different communication timing) between adjacent gateway systems 120.

While two instances of satellite gateway systems 120 and bidirectional satellite communication links 130 are illustrated as part of system 100, it should be understood that in some embodiments only a single satellite gateway system and a single bidirectional satellite communication link system are present or a greater number of satellite gateway systems 120 and bidirectional satellite communication links 130 are present. For example, for a satellite-based Internet service provider, four to eight (or significantly more) satellite gateway systems 120 and associated bidirectional satellite communication links 130 may be scattered geographically throughout a large region, such as North America.

User communication components 160, along with user terminals 180 and satellite antennas 170 (which can collectively be referred to as "user equipment") may be located in a fixed geographic location or may be mobile. For example, user communication components 160-1, satellite antenna 170-1, and user terminal 180-1 may be located at a residence of a subscriber that has a service contract with the operator of satellite gateway systems 120. The term "user" is intended only to distinguish from the gateway side of the network 100. For example, user terminal 180 can be associated with an individual subscriber to satellite communication services, with a corporate or other entity user, with a robotic user, with an employee of the satellite communication services provider, etc.

User communication components 160-1, satellite antenna 170-1, and user terminal 180-1 may be located at a fixed location 190. Fixed location 190 may be a residence, a building, an office, a worksite, or any other fixed location at which access to Internet 152 and/or private data source 151 is desired. User communication components 160-2, satellite antenna 170-2, and user terminal 180-2 may be mobile. For instance, such equipment may be present in an airplane, ship, vehicle, or temporary installation. Such equipment may be present at geographic location 195; however, geographic location 195 may change frequently or constantly, such as if the airplane, ship, or vehicle is in motion.

Satellite antenna 170-1 may be a small dish antenna, approximately 50 to 100 centimeters in diameter. Satellite antenna 170-1 may be mounted in a location that is pointed towards relay satellite 110, which may be in a geosynchronous orbit around the earth (i.e., the relay satellite 110 is a geosynchronous, or GEO, satellite). As such, the direction in which satellite antenna 170-1 is to be pointed stays constant. In some embodiments, low Earth orbit (LEO) and medium Earth orbit (MEO) satellites may be used in place of a geosynchronous satellite in the system. In some embodiments, relay satellite 110 is a high-throughput multi-beam satellite that communicates with user terminals using multiple (e.g., hundreds of) spot beams. In case of a multi-beam GEO satellite, for example, each of the multiple spot beams illuminates a respective coverage area. A fixed-location user terminal 180 can communicate with the relay satellite 110 generally via a particular one of the spot beams, unless there is some reason to reassign the user terminal 180 (e.g., in case of a gateway system 120 outage). Communications with mobile user terminals 180 can be handed off between spot beams as the mobile user terminal 180 moves through different coverage areas. In the case of non-GEO (e.g., MEO or LEO) relay satellites 110, spot beam coverage areas typically trace a path across the surface of the Earth with changes in the satellite's position relative to the Earth.

User communication component 160-1 refers to the hardware necessary to translate signals received from relay satellite 110 via satellite antenna 170-1 into a format which user terminal 180-1 can decode. Similarly, user communication components 160-1 may encode data received from user terminal 180-1 into a format for transmission via satellite antenna 170-1 to relay satellite 110. User communication components 160-1 may include a satellite communication modem. This modem may be connected with or may have incorporated a wired or wireless router to allow communication with one or more user terminals. In system 100, a single user terminal, user terminal 180-1, is shown in communication with user communication components 160-1. It should be understood that, in other embodiments, multiple user terminals may be in communication with user communication components 160-1. User terminal 180-1 may be various forms of computerized devices, such as: a desktop computer; a laptop computer; a smart phone; a gaming system or device; a tablet computer; a music player; a smart home device; a smart sensor unit; Voice over IP (VOIP) device, or some other form of computerized device that can access Internet 152 and/or private data source 151. Since user communication components 160 and a satellite antenna 170 can continue communicating with a satellite gateway system even if a user terminal 180 is not currently communicating with user communication components 160-

1, it should be understood that some instances of user equipment may not include a user terminal 180.

Despite being in motion or in a temporary location, user communication components 160-2, satellite antenna 170-2, and user terminal 180-2 may function similarly to user communication components 160-1, satellite antenna 170-1, and user terminal 180-1. In some instances, satellite antenna 170-2 may either physically or electronically point its antenna beam pattern at relay satellite 110. For instance, as a flight path of an airplane changes, satellite antenna 170-2 may need to be aimed in order to receive data from and transmit data to relay satellite 110. As discussed in relation to user terminal 180-1, only a single user terminal, user terminal 180-2, is illustrated as in communication with user communication components 160-2 as part of system 100. It should be understood that in other embodiments, multiple user terminals may be in communication with user communication components 160-2. For example, if such equipment is located on an airplane, many passengers may have computerized devices, such as laptop computers and smart phones, which are communicating with user communication components 160-2 for access to Internet 152 and/or private data source 151. As detailed in relation user terminal 180-1, user terminal 180-2 may be various forms of computerized devices, such as those previously listed.

While FIG. 1 illustrates only two instances of user communication components 160, two instances of satellite antennas 170, and two instances of user terminals 180, system 100 may involve any suitable number (e.g., hundreds or thousands) of instances of satellite antennas, user equipment, and user terminals distributed across various geographic locations. Some number of these instances may be in relatively fixed locations, while others of these instances may have periodically or constantly changing locations (e.g., mobile terminals, or aero terminals for providing Internet service in aircraft, or the like). Further, while only a single relay satellite 110 is shown, some architectures include multiple satellites, such as cooperating satellites in a constellation, multiple satellites with overlapping coverage areas, etc.

As described above, a wireless communication link can generally be between any transmitter and receiver via a wireless channel. In the context of system 100, some wireless communication links are forward links between a satellite gateway system 120 (transmitter) and a user terminal 180 (receiver) via the relay satellite 110, and other wireless communication links are return links between a user terminal 180 (transmitter) and a satellite gateway system 120 (receiver) via the relay satellite 110. As described herein, any signal traversing the wireless communication link is impacted at least by filtering and/or other link effects of the transmitter (e.g., of a pulse shaping filter near the output of the transmitter), of the receiver (e.g., a matched filter near the input of the receiver), and of components of the channel (e.g., antennas and transponders of the satellite). Characteristics of these link effects can impact the spectral efficiency of the channel, such as by impacting power spectral density, bit error rate, PAPR, SNR, etc. Embodiments described herein include novel approaches to implementing pulse shaping transmit filters, such as implemented in a satellite transmitter of either a satellite gateway system 120 or a user terminal 180. Some embodiments also include corresponding matched filters, such as implemented in a satellite receiver of either a user terminal 180 or a satellite gateway system 120.

Figure 2:
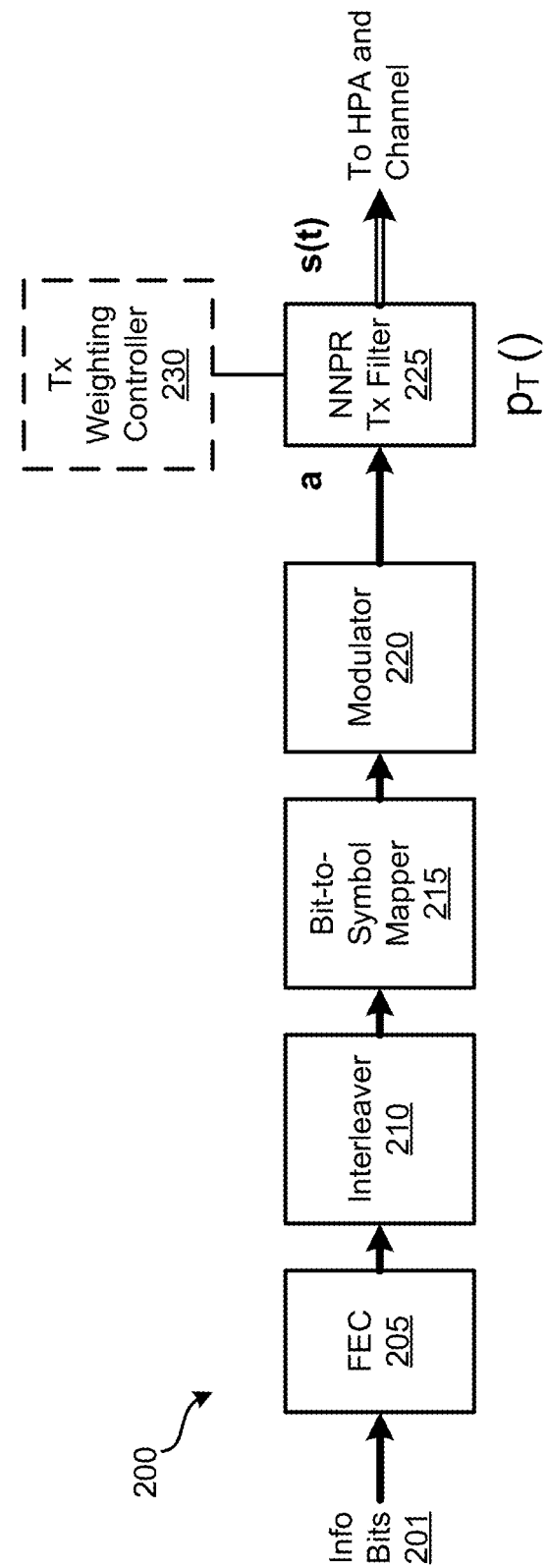
FIG. 2 shows a simplified block diagram of a portion of a baseband transmitter that includes a non-Nyquist partial response (NNPR) transmit filter, according to embodiments described herein.

FIG. 2 shows a simplified block diagram of a portion of a baseband transmitter 200 that includes a non-Nyquist partial response (NNPR) transmit filter 225, according to embodiments described herein. As described above, the baseband transmitter 200 can be implemented in the transmitter of a satellite gateway system 120 of FIG. 1, the transmitter of a user terminal 180 of FIG. 1, or at the transmit side of any suitable wireless communication link. As illustrated, the baseband transmitter 200 receives a stream of information bits 201 and outputs a transmission signal, s(t).

Embodiments of the baseband transmitter 200 include a transmitter front-end to convert the stream of information bits 201 into a modulated sequence of symbols. In the illustrated implementation, the transmitter front-end includes a forward error correction (FEC) block 205, an interleaver block 210, a bit-to-symbol mapper block 215, and a modulator block 220. The FEC block 05 encodes the data-source transmitting stream of information bits 201 into a stream of codebits. The interleaver block 210 can interleave the codebits, and the bit-to-symbol mapper block 215 can map the interleaved codebits onto an M-ary, two-dimensional signal constellation. For example, the bit-to-symbol mapper block 215 groups the bits into a correct order and chooses one of the M constellation points. This mapping generates a complex-valued symbol sequence, a=[$a_0$, $a_1$, . . . , $a_{N_s-1}$]. The symbol sequence is modulated onto a data signal by modulator block 220.

The modulated signal with the sequence of symbols is input to the NNPR transmit filter 225, and the NNPR transmit filter 225 applies pulse shaping to generate a pulse-shaped signal at its output, s(t). The pulse-shaped signal at the output of the NNPR transmit filter 225 can be described as:

$$s(t) = \sum_k a_k \cdot p_T(t - kT_s), \quad (1)$$

where $T_s$ is the symbol-period (i.e., $$R_s = \frac{1}{T_s}$$

is the symbol-rate) and $p_T$ represents the impulse response of the NNPR transmit filter 225.

At described herein, $p_T$ is parametrically controllable to achieve a desired trade-off between throughput and power penalty based on at least two tunable weighting factors. Embodiments of the NNPR transmit filter 225 include, or are in communication with, a transmitter weighting controller 230 configured to set the tunable weighting factors. The transmitter weighting controller 230 can be configured to set the tunable weighting factors based on pre-programmed settings (e.g., hard- or soft-coded in circuitry of the NNPR transmit filter 225), based on received user commands (e.g., based on manual configuration by a user), or based on automated feedback control (e.g., based on measurement of channel filter response characteristics). As illustrated, the pulse-shaped signal can be passed to downstream transmitter components, such as a high-power amplifier, and the pulse-shaped signal can be transmitted over a wireless channel to a receiver.

Figure 3:
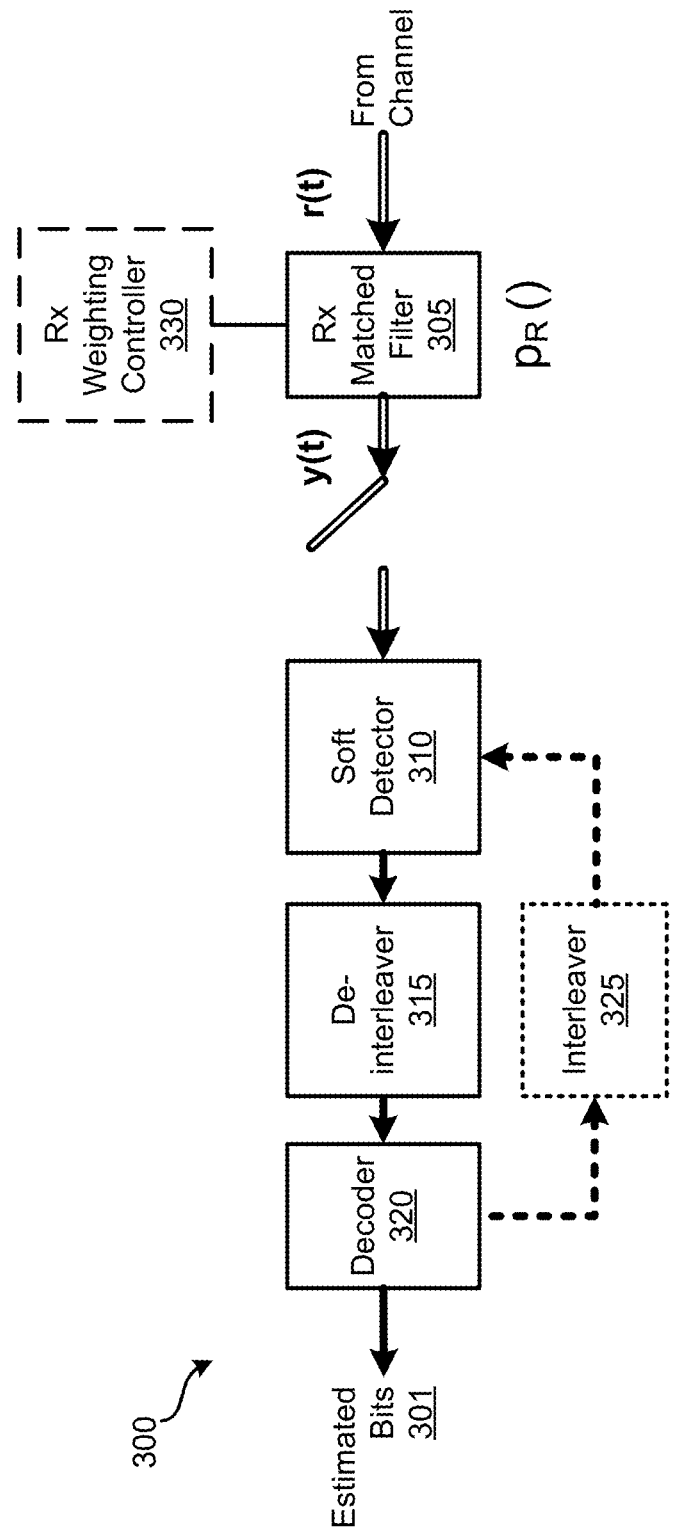
FIG. 3 shows a simplified block diagram of a receiver that includes a matched filter, according to embodiments described herein.

FIG. 3 shows a simplified block diagram of a receiver 300 that includes a matched filter 305, according to embodiments described herein. As described above, the receiver 300 can be implemented in the receiver of a satellite gateway system 120 of FIG. 1, the receiver of a user terminal 180 of FIG. 1, or at the receive side of any suitable wireless communication link. As illustrated, the receiver 300 receives the modulated signal including the stream of symbols from the transmitter (e.g., from baseband transmitter 200 of FIG. 2) via a wireless channel (e.g., a relay satellite), and the receiver 300 converts the stream of symbols into a stream of estimated bits 301 intended to be identical to (or at least to match as closely as possible to) the stream of information bits 201.

As noted above, the spectral power properties of the modulated signal, as received by the receiver, are affected by at least characteristics of the NNPR transmit filter 225 and characteristics of the wireless channel. For simplicity, the wireless channel is assumed to be an additive white Gaussian noise (AWGN) channel. As such, the signal, as received at the receiver input, can be expressed as:

$$r(t) = s(t) + \tilde{n}(t), \qquad (2)$$

Here, ñ(t) is zero-mean AWGN with single-sided power spectral density (PSD) of $N_0$ (Watt/Hz). As illustrated, the signal r(t) is received by a matched filter 305, and the matched filter 305 generates a corresponding matched filter output signal y(t). A sampled version of the signal y(t) is passed to a receiver back-end for conversion into the stream of estimated bits 301. In the illustrated implementation, the receiver back-end includes a soft detector block 310, a de-interleaver block 315, and a decoder block 320. The soft detector block 310 can effectively perform a soft conversion of the sampled output of the matched filter 305 from samples into bit probabilities, which are then de-interleaved and decoded to arrive at the best bit estimates. Some embodiments include a receiver implementing soft-subtractive cancellation. In some implementations, the receiver back-end also includes an interleaver block 325 coupled in feedback between the decoder block 320 and the soft detector block 310.

The matched filter can be defined as:

$$p_R(t) = p_T(-t). \qquad (3)$$

Assuming ideal synchronization, the signal y(t) at the output of the matched filter 305 can be given by:

$$y(t) = \int_{-\infty}^{\infty} r(\alpha) \cdot p_R(\alpha - t) d\alpha. \qquad (4)$$

As noted above, the signal y(t) is sampled before being passed to the receiver back-end. For example, the signal y(t) is sampled at integer multiples of the symbol-period to obtain:

$$y(nT_s) = y_n = \sum_l a_{n-l} g_l + n'_n; n = 0, 1, \ldots, N_s - 1, \qquad (5)$$

where n' is bandlimited Gaussian noise.

Another equation can be defined as:

$$g_l = p_R(t) * p_T(t)|_{t=lT_s}. \qquad (6)$$

With (6), the matched filter output y(t) in (5) can be rewritten as:

$$y_n = a_n g_0 + \sum_{\substack{l \\ l \neq 0}} a_{n-l} g_l + n'_n. \qquad (7)$$

It can be inferred from (7) that the matched filter output at time-instant n contains not only the desired symbol and noise, but also potential interference from post-cursor and pre-cursor transmitted symbols (i.e., ISI). The relative strength of this ISI and its time span depends on the coefficients $g_l$; $l \neq 0$, and hence on the choice of the filter-pair $\{p_T(t), p_R(t)\}$.

Matching the characteristics of the matched filter 305 to those of the NNPR transmit filter 225 can involve setting comparable tunable weighting factors in the matched filter 305 to match those used by the NNPR transmit filter 225. As illustrated, embodiments of the matched filter 305 include, or are in communication with, a receiver weighting controller 330 configured to set the tunable weighting factors. The receiver weighting controller 330 can be configured to set the tunable weighting factors based on pre-programmed settings (e.g., hard- or soft-coded in circuitry of the matched filter 305), based on received user commands (e.g., based on manual configuration by a user), or based on automated feedback control (e.g., based on measurement of channel filter response characteristics). In some embodiments, the tunable weighting factors in the receiver weighting controller 330 are set by the transmitter weighting controller 230 (e.g., via signaling over the same, or a different communication channel), or the tunable weighting factors in the transmitter weighting controller 230 are set by the receiver weighting controller 330.

Figure 4A:
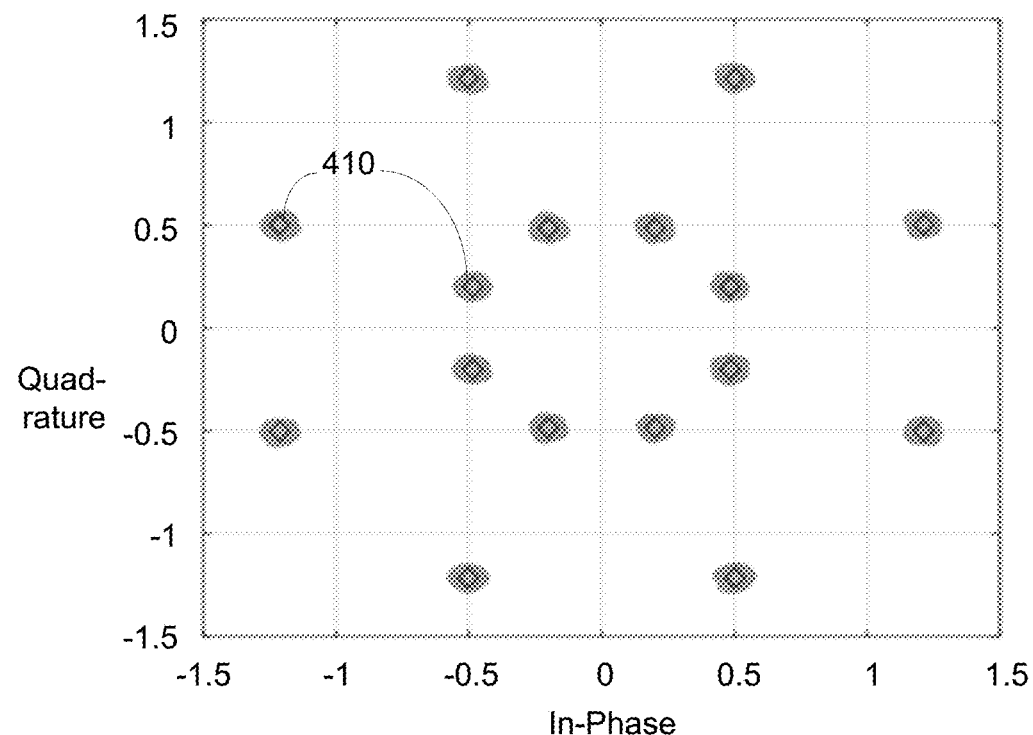
FIGS. 4A and 4B show noiseless scatterplots at the output of a receiver matched filter, such as the matched filter of FIG. 3, when 16-APSK modulation is processed by two different types of filter pairs.
Figure 4B:
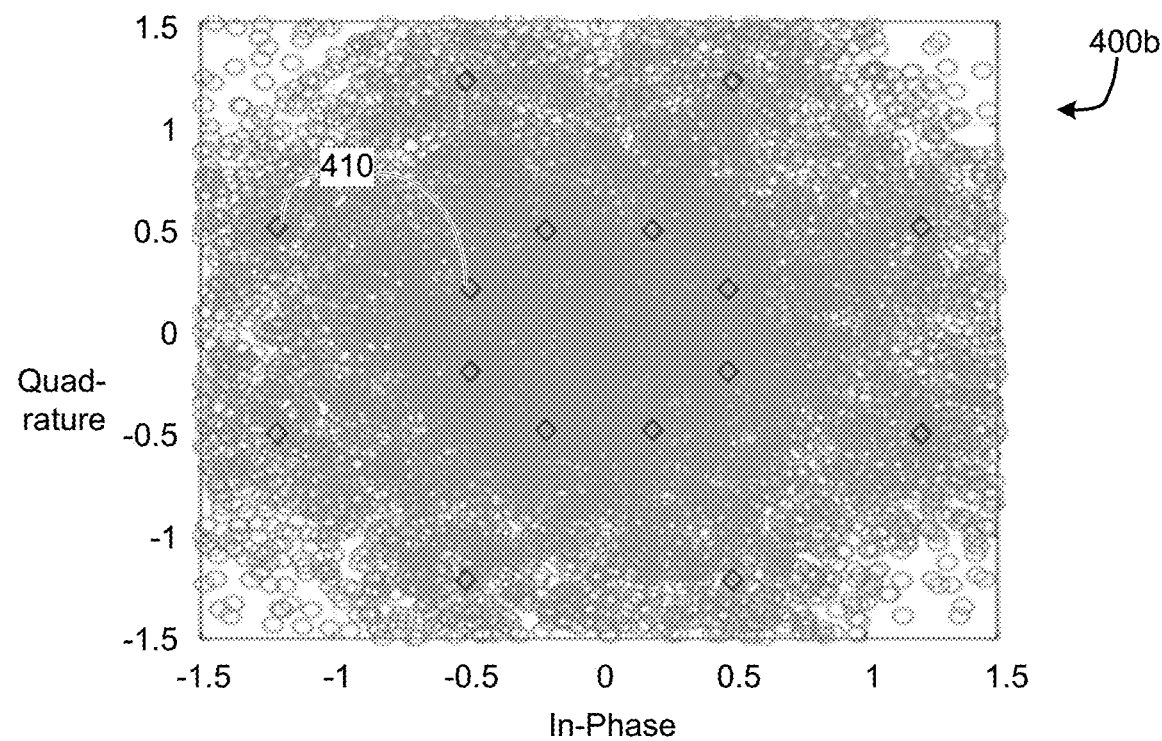

FIGS. 4A and 4B show noiseless scatterplots 400 at the output of a receiver matched filter, such as the matched filter 305 of FIG. 3, when 16-APSK modulation is processed by two different types of filter pairs. In general, FIG. 4A represents an example of conventional Nyquist-based pulse shaping, and FIG. 4B represents an example of conventional non-Nyquist-based pulse shaping. In FIG. 4A, the filter pair $\{p_T(t), p_R(t)\}$ are both conventional RRC filters with a roll-off factor of 0.05. In FIGS. 4B, the filter pairs use conventional partial response filters for pulse shaping and matched filtering, as described in U.S. Pat. No. 9,742,599, titled "Partial response signaling techniques for single and multi-carrier nonlinear satellite systems."

As illustrated, FIG. 4A shows relatively little clustering around the ideal constellation points 410, and FIG. 4B shows a relatively large amount of clustering around the ideal constellation points 410. This indicates that the conventional RRC filters of FIG. 4A manifest relatively little ISI, and the conventional partial response filters of FIG. 4B manifest relatively severe ISI. As noted above, this effect stems primarily from the fact that the conventional RRC filters are based on Nyquist pulse-shaping waveforms, while the partial response filters are based on non-Nyquist pulse-shaping waveforms.

Figure 5A:
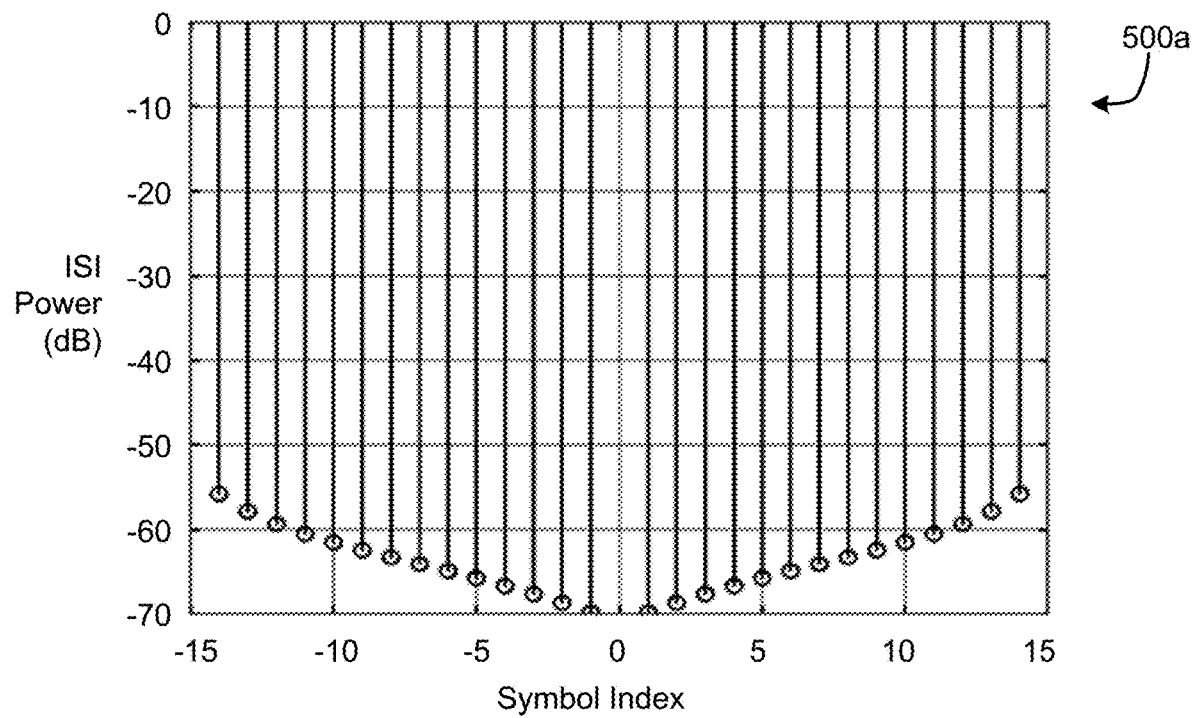
FIGS. 5A and 5B show plots of ISI power by symbol index for the conventional filter pairs represented in FIGS. 4A and 4B, respectively.
Figure 5B:
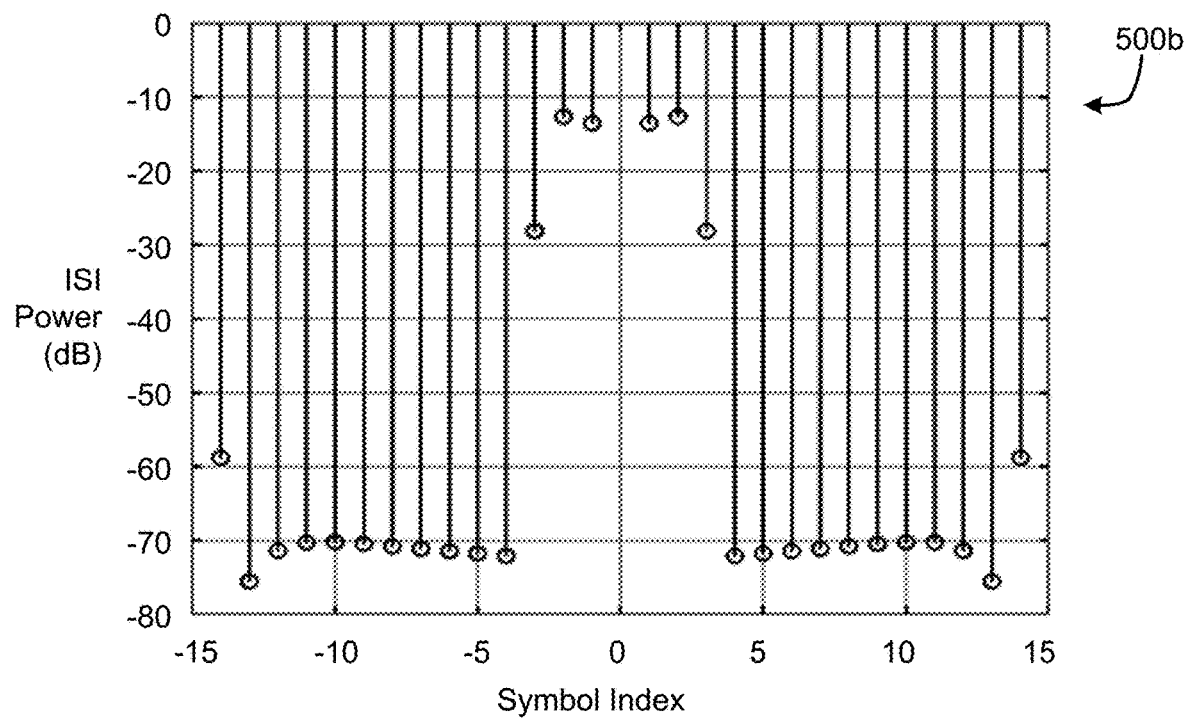

FIGS. 5A and 5B show plots 500 of ISI power by symbol index for the conventional filter pairs represented in FIGS. 4A and 4B, respectively. In the illustrated plots, symbol index '0' indicates the location of the desired symbol. The illustrated ISI power is the power in the ISI coefficients, as given by $20 \log_{10}|g_l|$, $l \neq 0$ for the conventional RRC-based filter pair in FIG. 5A and for the conventional partial response-based filter pair in FIG. 5B. The cumulative ISI power for the conventional RRC-based filter pair at the matched filter output is approximately −36 dB at the designed roll-off factor of 0.05. In comparison, the cumulative ISI power for the partial response-based filter pair at the matched filter output is approximately −7 dB, which is appreciably larger. As the ISI power increases, accurate recovery of information bits from the received signal (i.e., with acceptable bit error rate performance, etc.) may only be possible with more complex receiver designs that can implement sufficiently commensurate mitigation techniques.

It is typical to design communication systems in a manner that seeks to maximize spectral efficiency. For wireless communication links, such as satellite communication links, attempts at maximizing spectral efficiency can often encounter a trade-off between increasing throughput and decreasing error rates. Thus, a design may seek to increase throughput for a given SNR (which can correspond with a particular power penalty), or to decrease SNR for a given throughput. For example, in filter pair design, for a given error rate (e.g., forward error correction, or FEC, rate) and constellation (e.g., 16-APSK), spectral efficiency can be increased by increasing throughput, which can correspond to increasing the symbol rate supported by the filter pair. FIGS. 4A-5B begin to demonstrate that conventional attempts to design pulse shaping filters that support increased symbol rate have faced their own trade-off: designs either yield a more efficiently utilization of fixed channel bandwidth at the expense of higher ISI (e.g., conventional partial response-based designs), or are substantially free of ISI at the expense of less efficient utilization of fixed channel bandwidth. Embodiments of the NNPR-based filtering described herein provide multi-dimensional weighting of filter components to support a parametrically controllable trade-off between impulse response, power spectral density, and ISI power of the filter.

Scaling functions, such as those belonging to the Meyer wavelet family, which satisfy Nyquist's ISI free criterion, have been considered previously for baseband pulse shaping. Alternatively, Nyquist filters can be generated by applying well-known orthogonalization procedures to arbitrary waveforms that exhibit very good time-frequency characteristics. Embodiments of NNPR filters described herein use a novel "modified orthogonalization" approach to better shape the signal spectrum at the NNPR transmit filter 225 output and to control the ISI power experienced at the matched filter 305 output.

The modified orthogonalization approach is described with reference to a typical Gaussian waveform. Some implementations of NNPR filters are designed to use such Gaussian waveforms. Other implementations of NNPR filters can be designed to use any suitable time-limited waveform shape. The Gaussian waveform is known to have excellent time-frequency characteristics and can be expressed as:

$$s_G(t) = \frac{e^{-(t^2/4(\sigma T_s)^2)}}{2\sqrt{\pi}\,\sigma T_s}. \tag{8}$$

The corresponding frequency response is found as:

$$S_G(f) = e^{-((2\pi f)^2(\sigma T_s)^2)}. \tag{9}$$

Figure 6A:
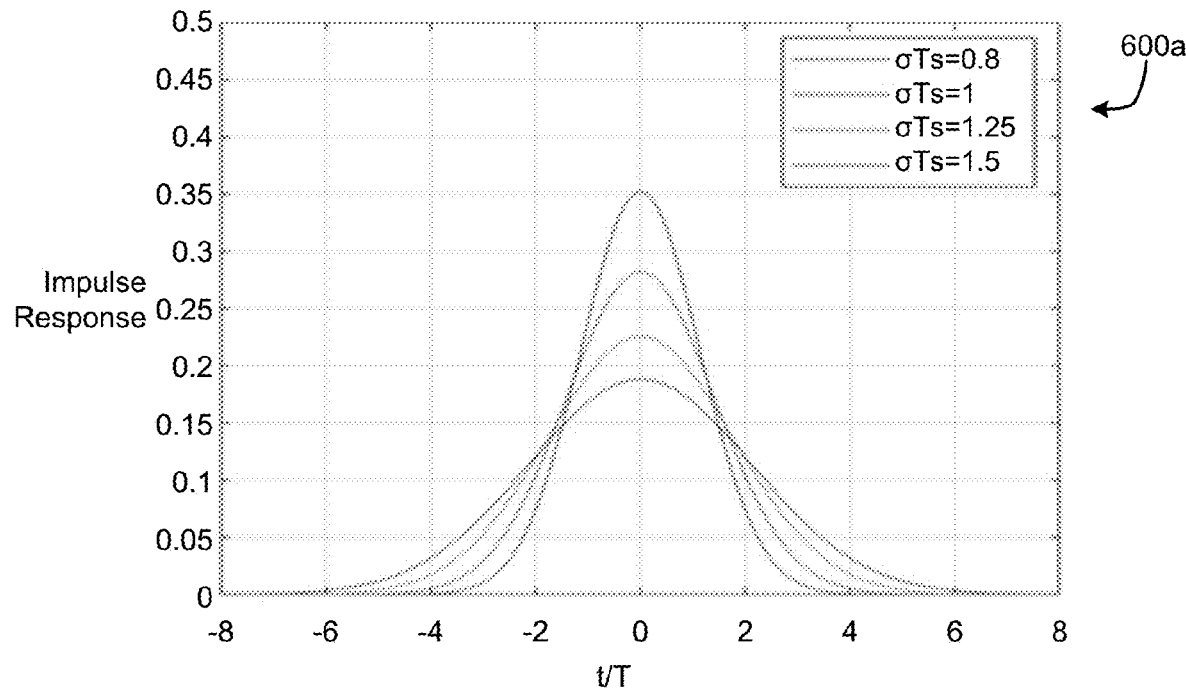
FIGS. 6A and 6B show color plots of Gaussian waveform impulse responses and magnitude responses, respectively, for different values of a product of standard deviation and symbol rate, $\sigma T_s$.
Figure 6B:
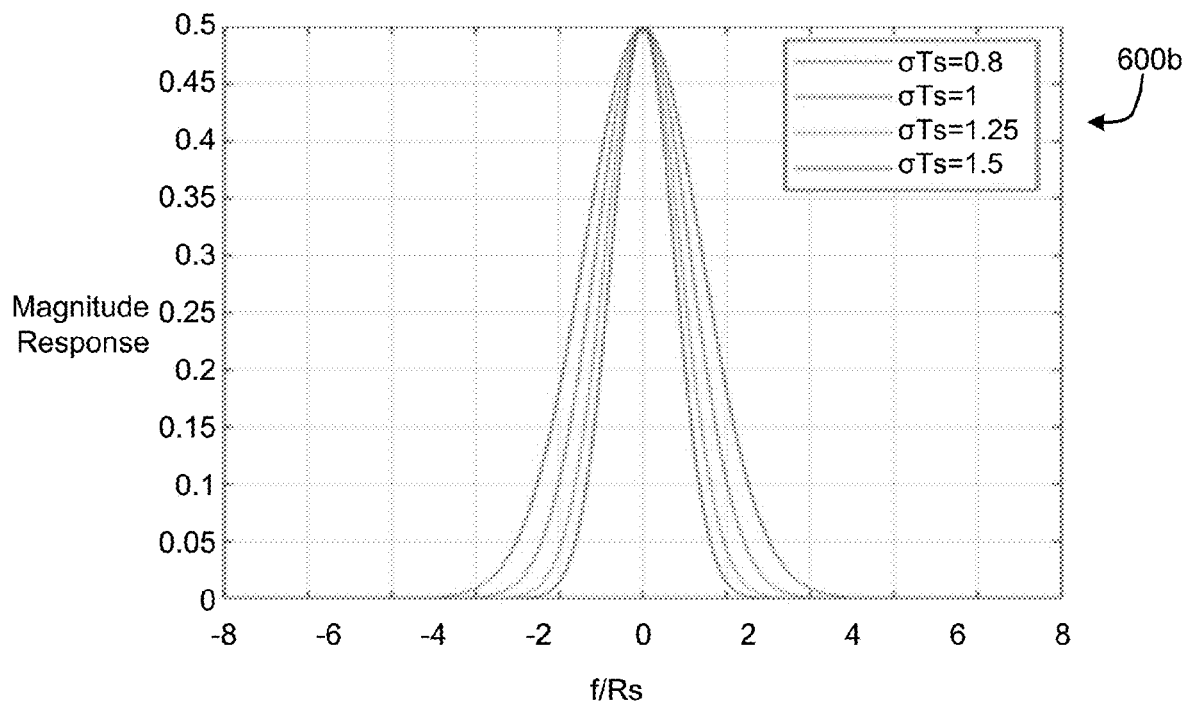

FIGS. 6A and 6B show plots 600 of Gaussian waveform impulse responses and magnitude responses, respectively, for different values of a product of standard deviation and symbol rate, $\sigma T_s$. The plots 600 indicate very good time-frequency characteristics. However, it be inferred that $s_G(t)$ cannot be directly utilized for pulse shaping due to the very severe ISI that will be induced at the matched filter 305 output. Some conventional approaches apply conventional orthogonalization to the Gaussian waveform (or other time-limited waveforms) to generate Nyquist filter pairs. For example, such conventional filter designs seek to obtain some of the advantageous time-frequency characteristics of the non-Nyquist waveform, while also converting the waveform into a Nyquist filter pair for ISI free output at the receiver filter. However, such conventional filer designs tend to lose a significant amount of spectral advantage relative, not only compared to the original Gaussian waveform, but also compared to even state-of-the-art RRC filters with small roll-off factors, such as 0.1 or 0.05. As noted above, there tends to be a trade-off. For example, increasing $\sigma T_s$ can improve spectral occupancy, but doing so also tends to increase peak to average power ratio (PAPR).

The novel modified orthogonalization can address limitations to conventional pulse shaping filter approaches, such as those described above. Applying the modified orthogonalization to $S_G(f)$ (Equation (9), above) yields the following:

$$\phi_{NNPR}(f) = S_G(f) / \left[\sum_{k \in \mathbb{Z}} \left|S_G\left(f + \frac{k \cdot \gamma_f(k)}{T_s}\right)\right|^2\right]^{1/2}. \tag{10}$$

In Equation (10), $\gamma_f(k)$ is a positive real number≤1. The impulse response of the NNPR transmit filter 225, $p_{NNPR,T}(t)$, can be obtained by converting $\phi_{NNPR}(f)$ from the frequency domain to the time domain in any suitable manner. In some implementations, an inverse Fourier transform is applied to $\phi_{NNPR}(f)$ to obtain $p_{NNPR,T}(t)$. A corresponding matched filter 305 can be obtained using Equation (4). It can be seen from Equations (9) and (10) that spectrum shaping can be parametrically controlled by carefully setting $\sigma T_s$ and $\gamma_f(k)$.

Figure 7A:
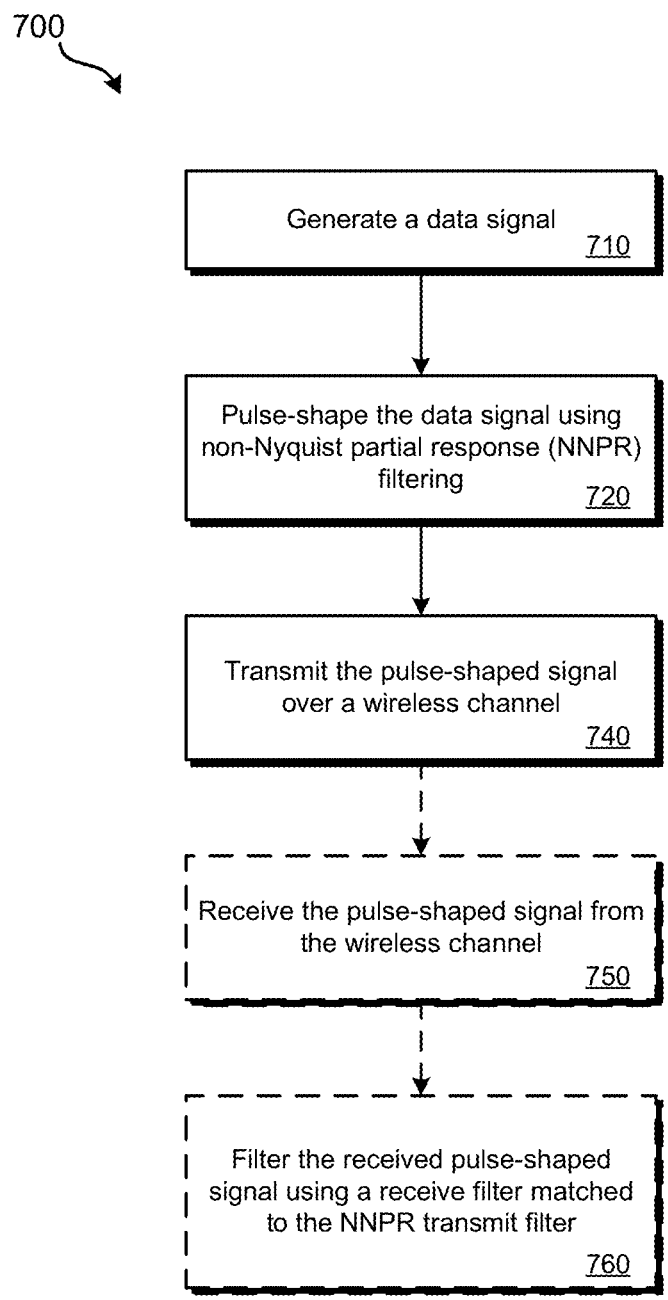
FIGS. 7A and 7B show flow diagrams of a method for communicating a data signal in a wireless communication network, according to various embodiments.
Figure 7B:
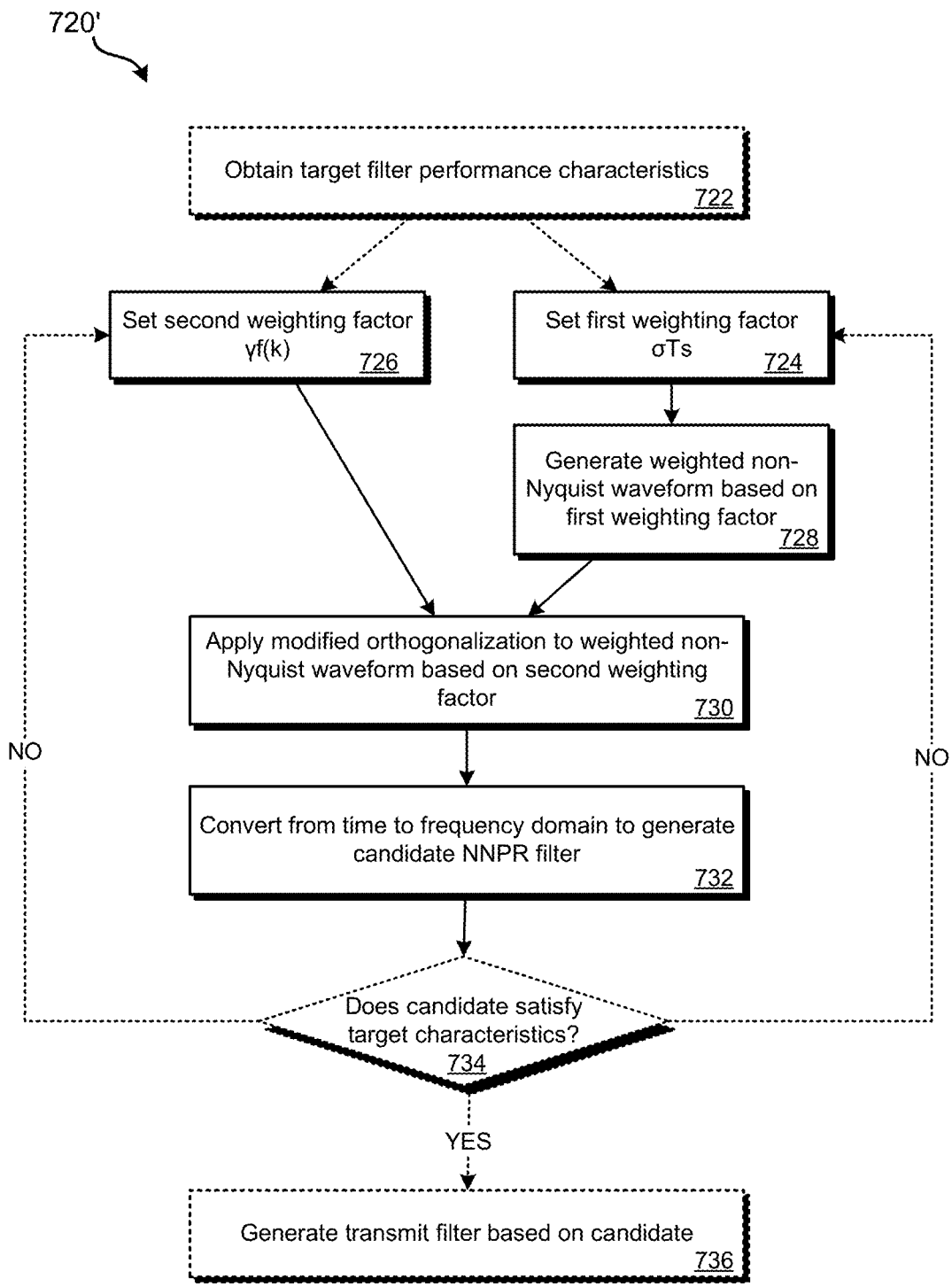

FIGS. 7A and 7B show flow diagrams of a method 700 for communicating a data signal in a wireless communication network, according to various embodiments. Embodiments of the method 700 can begin at stage 710 by generating a data signal. The generating at stage 710 can involve converting a stream of information bits to a sequence of symbols by a transmitter, and modulating the sequence of symbols onto the data signal by the transmitter. In some embodiments, converting the stream of information bits to the sequence of symbols includes: applying a coding scheme to the stream of information bits to generate codebits; interleaving the codebits to generate interleaved codebits; mapping the interleaved codebits onto a multi-dimensional signal constellation to generate constellation points; and selecting from the constellation points to generate the sequence of symbols as a sequence of complex-value symbols.

At stage 720, embodiments can pulse-shape the data signal with a non-Nyquist pulse-shaping waveform to generate a pulse-shaped signal. As described herein, such pulse shaping is performed by a novel type of non-Nyquist partial response (NNPR) transmit filter. Embodiments can weight a non-Nyquist waveform as a function of a first tunable weighting factor to generate a weighted non-Nyquist waveform. Embodiments can then generate the non-Nyquist pulse-shaping waveform by applying weighted orthogonalization to the weighted non-Nyquist waveform as a function of a second tunable weighting factor. As described herein, the second tunable weighting factor controls a non-zero amount of inter-symbol interference ISI in the non-Nyquist pulse-shaping waveform.

FIG. 7B shows a flow diagram 720' of a method for implementing the pulse shaping of stage 720. The method 720' can begin at stage 722 by obtaining target filter performance characteristics. For example, the target filter performance characteristics include at least a target throughput characteristic and a target power penalty characteristic for the wireless channel. The target throughput characteristic can correspond to a target power spectral density. The target power penalty characteristic can correspond to one or more of a target SNR, a target ISI power, a target ACI power, etc. At stages 724 and 726, embodiments of the method 720' can set the first tunable weighting factor and the second tunable weighting factor to satisfy or exceed the target filter performance characteristics. For example, the weighting factors are set, such that the non-Nyquist pulse-shaping waveform is generated to yield a throughput at least meeting the target throughput characteristic accompanied by a power penalty at least meeting the target power penalty characteristic.

At stage 728, embodiments of the method 720' generate a weighted non-Nyquist waveform based on the first tunable weighting factor. For example, the weighted non-Nyquist waveform is a Gaussian waveform having a frequency response:

$$S_G(f) = e^{-((2\pi f)^2(\sigma T_s)^2)},$$

where $\sigma T_s$ is the first tunable weighting factor.

At stage 730, embodiments of the method 720' apply weighted orthogonalization to the weighted non-Nyquist waveform as a function of a second tunable weighting factor to generate the non-Nyquist pulse-shaping waveform. For example, the non-Nyquist pulse-shaping waveform is generated to have a frequency response:

$$\phi_{NNPR}(f) = S_G(f) / \left[ \sum_{k \in \mathbb{Z}} \left| S_G\left(f + \frac{k \cdot \gamma_f(k)}{T_s}\right) \right|^2 \right]^{1/2},$$

where $\gamma_f(k)$ is the second tunable weighting factor.

At stage 732, embodiments of the method 720' convert the frequency response of the non-Nyquist pulse-shaping waveform from the frequency domain to the time domain, effectively generating a candidate for the NNPR transmit filter. For example, an inverse Fourier transform, such as an inverse fast-Fourier transform (IFFT), is used for the frequency-to-time-domain conversion. The result of the conversion can be expressed as a candidate impulse response for the NNPR transmit filter, $p_{NNPR,T}(t)$. In some embodiments, the target filter performance characteristics include a target impulse response characteristic for the wireless channel. In such cases, the first tunable weighting factor and the second tunable weighting factor can be set, such that the non-Nyquist pulse-shaping waveform is generated to yield an impulse response that at least meets the target impulse response characteristic.

In some embodiments, the method 720' can use the candidate NNPR transmit filter generated in stage 732 as the NNPR transmit filter. In other embodiments, at stage 734, the method 720' can evaluate whether the candidate NNPR transmit filter at least satisfies the target filter performance characteristics. For example, a determination can be made as to whether the impulse response, throughput, and/or power penalty satisfy corresponding target characteristics. If the candidate satisfies (e.g., or optimizes) the target characteristics, the candidate can be used to generate the NNPR transmit filter at stage 736. If not, embodiments of the method 720' can return to stages 724 and 726 to select a different configuration for the first and/or second tunable weighting factors.

In some cases, the NNPR transmit filter is part of a transmitter disposed in a satellite gateway system, and the wireless channel communicatively couples the satellite gateway system with one or more user terminals via a relay satellite. In such cases, the relay satellite (e.g., the transponder through which the signal is relayed) can manifest a channel filter response for the wireless channel. The first tunable weighting factor and the second tunable weighting factor can be set, based on the channel filter response, to maximize a throughput over the wireless channel at a given power penalty, and/or to minimize a power penalty at a given throughput over the wireless channel. In some such cases, the first tunable weighting factor and the second tunable weighting factor are set, based on the channel filter response: to maximize a throughput over the wireless channel at a given power penalty, and/or to minimize a power penalty at a given throughput over the wireless channel for forward-link communications over the wireless channel; and further to minimize adjacent channel interference for return-link communications over the wireless channel. Such trade-offs and optimizations are described more fully, for example, with reference to FIGS. 8A-12.

Returning to FIG. 7A, at stage 740, embodiments can transmit the pulse-shaped signal by the transmitter over the wireless channel of the wireless communication system. For example, the transmitter communicates the signal from a satellite gateway system to one or more user terminals via a relay satellite; or the transmitter communicates the signal from a user terminal to a satellite gateway system via a relay satellite.

At stage 750, embodiments receive the pulse-shaped signal by a receiver via the wireless channel. At stage 760, embodiments filter the received pulse-shaped signal by a receive filter of the receiver that is matched to the pulse-shaping of the NNPR filter. For example, the settings for the first and second tunable weighting factors obtained by method 720' can be applied to configure the matched receive filter. In some embodiments, the receiver further performs one or more of sampling the received pulse-shaped signal at an output of the matched filter to generate symbol samples; and soft-converting the symbol samples to bit probabilities, and de-interleaving and decoding the bit probabilities to obtain a stream of estimated bits corresponding to the stream of information bits.

Figure 8A:
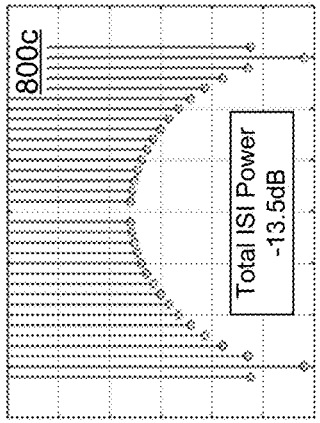
FIGS. 8A-8I show multiple plots of filter performance characteristics for three setting conditions in which the first weighting factor is held constant while the second weighting factor changes.
Figure 8D:
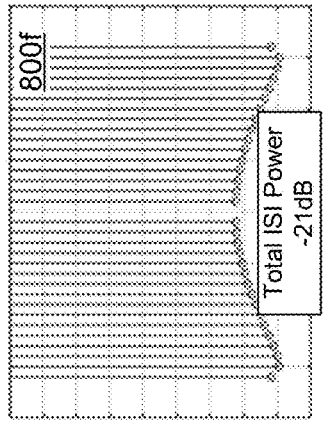
Figure 8G:
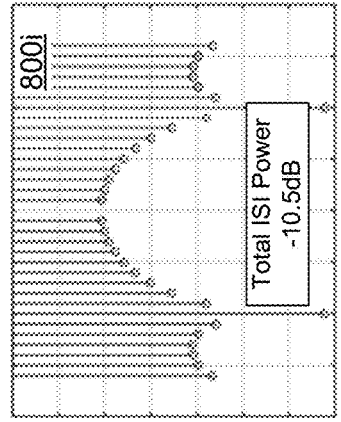
Figure 8B:
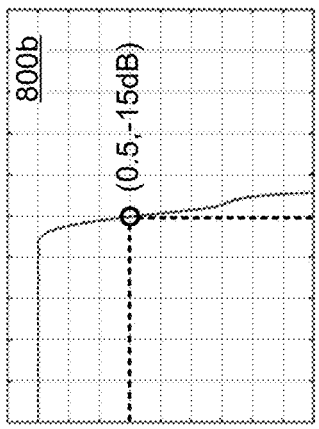
Figure 8E:
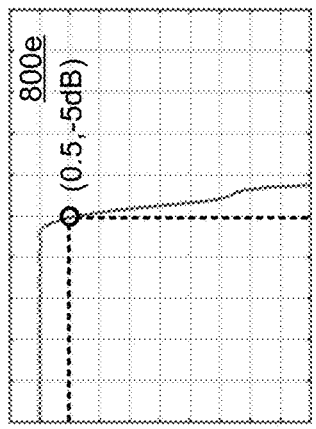
Figure 8H:
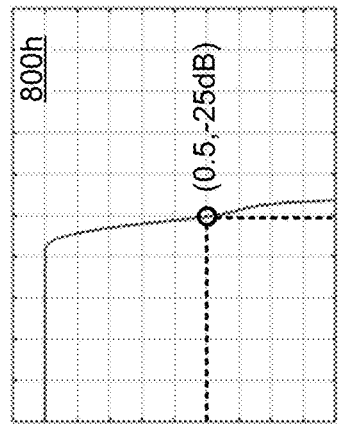
Figure 8C:
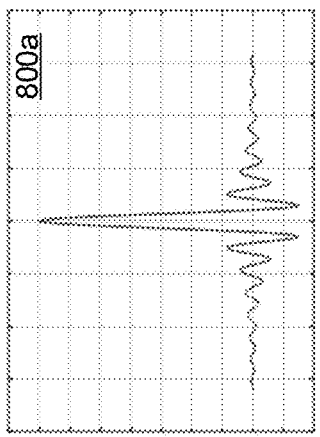
Figure 8F:
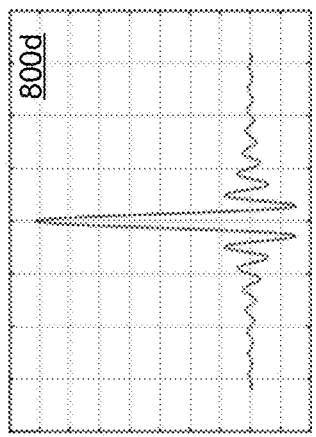
Figure 8I:
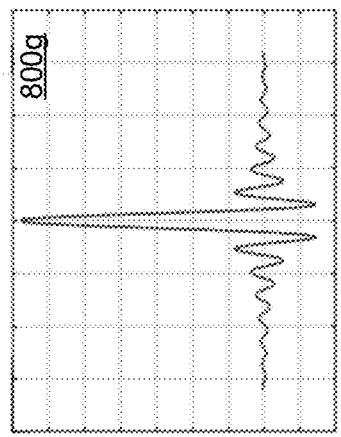

Several figures below demonstrate features of novel NNPR approaches to generating a filer pair with a pulse shaping transmit filter and a matched receiver filter, as described herein. FIGS. 8A-8I show multiple plots 800 of filter performance characteristics for three setting conditions in which the first weighting factor is held constant while the second weighting factor changes. In each setting condition, the first weighting factor is set to $\sigma T_s = 0.9$; and $\gamma_f(k) = 1 \forall k \neq \pm 1$, with different values considered for $\gamma_f(k)$; $k = \pm 1$. FIGS. 8A, 8D, and 8G are plots of impulse response ($p_{NNPR}(t)$) versus t/Ts. FIGS. 8B, 8E, and 8H are plots of power spectral density (in decibels) versus a normalized frequency. FIGS. 8C, 8F, and 8I are plots of ISI power (in decibels) versus a symbol index (index '0' is the desired symbol).

FIGS. 8A-8C show plots 800a-800c of impulse response, power spectral density, and ISI power, respectively, for a first setting condition in which $\gamma_f(\pm 1)=0.94$. In that setting condition, plot 800b shows a power spectral density of approximately −15 dB at a normalized frequency of 0.5, and plot 800c shows a total ISI power of approximately −13.5 dB. FIGS. 8D-8F show plots 800d-800f of impulse response, power spectral density, and ISI power, respectively, for a second setting condition in which $\gamma_f(\pm 1)=0.98$ (i.e., the second weighting factor is higher than in the first setting condition). In the second setting condition, in comparison to the first setting condition, plot 800e shows a higher power spectral density of approximately −5 dB at the same normalized frequency of 0.5, but plot 800f shows a lower total ISI power of approximately −21 dB. FIGS. 8G-8I show plots 800g-800i of impulse response, power spectral density, and ISI power, respectively, for a third setting condition in which $\gamma_f(\pm 1)=0.90$ (i.e., the second weighting factor is lower than in both of the other setting conditions). In the third setting condition, in comparison to the other two setting conditions, plot 800h shows a lower power spectral density of approximately −25 dB at the same normalized frequency of 0.5, while plot 800i shows a higher total ISI power of approximately −10.5 dB.

The figures demonstrate that, for a fixed $\sigma T_s$, smaller values of $\gamma_f(k)$ tend to make the spectrum more compact and to reduce the ringing in impulse response. However, reducing $\gamma_f(k)$; k=±1 also tends to increase the ISI power at the matched filter 305 output. In general, more ringing in the time domain tends to result in a larger PAPR and increased sensitivity to timing jitter during receiver synchronization.

Figure 9A:
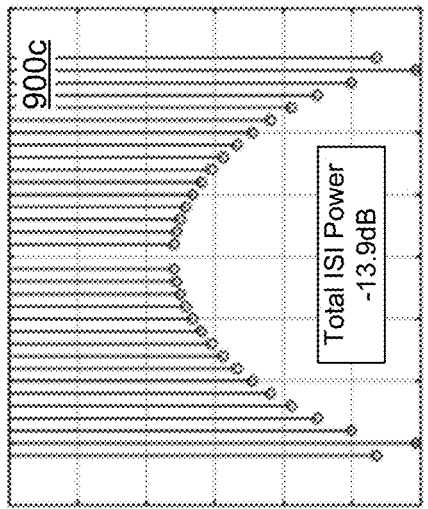
FIGS. 9A-9F show multiple plots of filter performance characteristics for two setting conditions in which the first weighting factor changes while the second weighting factors is held constant.
Figure 9D:
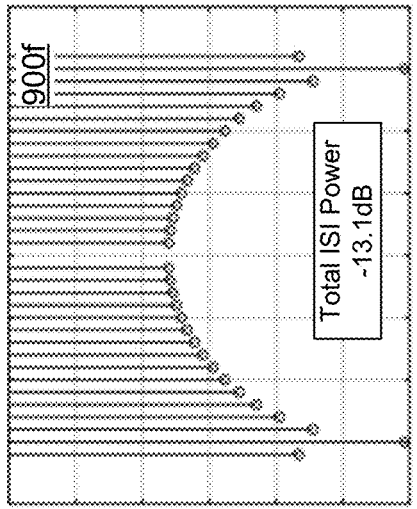
Figure 9B:
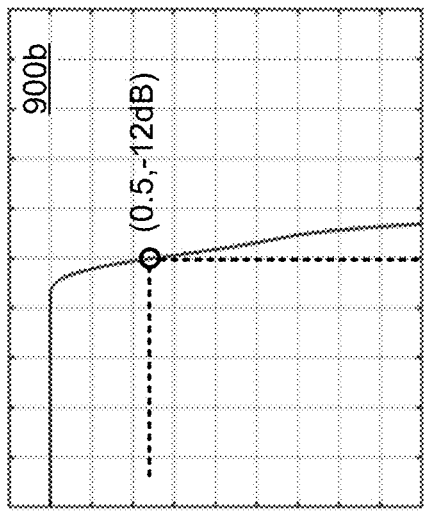
Figure 9E:
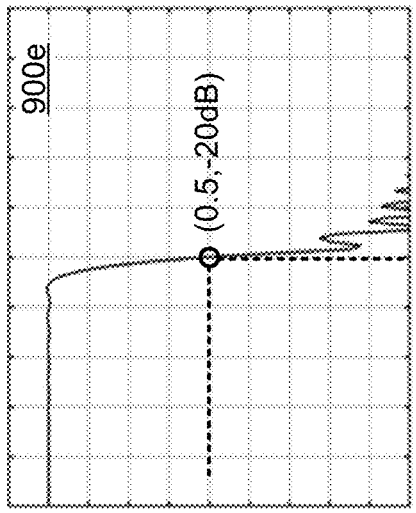
Figure 9C:
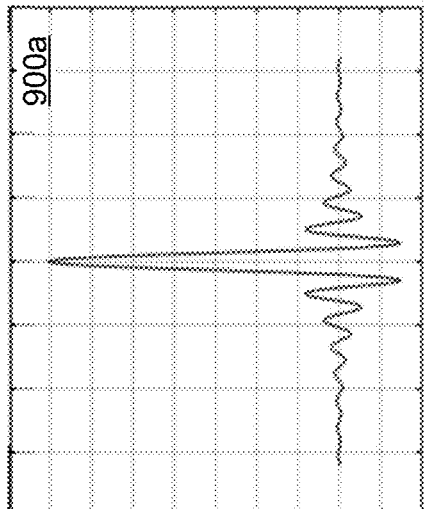
Figure 9F:
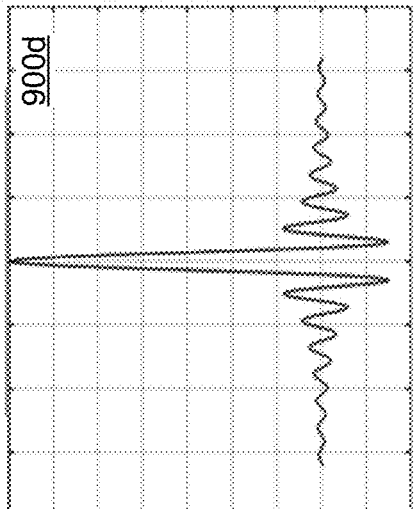

FIGS. 9A-9F show multiple plots 900 of filter performance characteristics for two setting conditions in which the first weighting factor changes while the second weighting factors is held constant. In each setting condition, the second weighting factor is set to $\gamma_f(k)=0.94$; k=±1, with different values considered for $\sigma T_s$. FIGS. 9A and 9D are plots of impulse response $(p_{NNPR}(t))$ versus t/Ts. FIGS. 9B and 9E are plots of power spectral density (in decibels) versus a normalized frequency. FIGS. 9C and 9F are plots of ISI power (in decibels) versus a symbol index (index '0' is the desired symbol).

FIGS. 9A-9C show plots 900a-900c of impulse response, power spectral density, and ISI power, respectively, for a first setting condition in which $\sigma T_s=0.8$. In that setting condition, plot 900b shows a power spectral density of approximately −12 dB at a normalized frequency of 0.5, and plot 900c shows a total ISI power of approximately −13.9 dB. FIGS. 9D-9F show plots 900d-900f of impulse response, power spectral density, and ISI power, respectively, for a second setting condition in which $\sigma T_s=1.0$ (i.e., the first weighting factor is higher than in the first setting condition). In the second setting condition, in comparison to the first setting condition, plot 900e shows a lower power spectral density of approximately −20 dB at the same normalized frequency of 0.5, and plot 900f shows a slightly lower total ISI power of approximately −13.1 dB. These plots 900 demonstrate that larger values of $\sigma T_s$ tend to make the power spectral density main-lobe more compact, while increasing the ringing in the impulse response and ISI power at the receiver. As such, parametric control over the impulse response characteristics, power spectrum, and ISI power can be achieved based on settings of the first weighting factor ($\sigma T_s$) and the second weighting factor ($\gamma_f(k)$).

Embodiments can determine a desired trade-off between impulse response characteristics, power spectrum, and ISI power characteristics based on target filter parameters. A wireless channel is typically bandwidth-limited and power-limited. Achieving better spectral efficiency an involve balancing throughput and power penalty. For example, throughput can be characterized by a product of spectral efficiency and bandwidth, such that throughput can be affected by forward error correction (FEC) code rate and constellation choice (MODCODE), and symbol rate. For any particular choice of MODCODE, then, increasing throughput involves increasing symbol rate. However, symbol rate can effectively be limited by the compactness of the spectrum, which can be determined by characteristics of the pulse shaping filter at the transmitter, any channel filters in the wireless channel, and the matched filter at the receiver. Embodiments of the NNPR filtering approaches described herein yield more compact spectrum (i.e., the same signal power can be packed into a smaller range of frequencies). In particular, the NNPR filtering can be designed to achieve better main lobe performance (i.e., increasing the number of channels that can be packed into a same frequency band) with faster roll-off (i.e., minimizing ACI). By effectively packing more symbols into the same bandwidth, the NNPR filtering can yield higher throughput at a given power penalty (e.g., a same SNR), and/or a lower power penalty at a given throughput.

In the forward-link, embodiments can seek to optimize the NNPR filtering based on channel filter characteristics. In the return link, embodiments can seek to optimize the NNPR filtering based on minimizing adjacent channel interference. In some cases, the wireless channel can include a transponder, which can manifest a particular channel filter response; and the weighting factors can be set to optimize throughput versus power penalty in the forward link based on that channel filter response. For example, suppose a satellite transponder includes a channel filter configured to sit at approximately −5 db at a 0.5 normalized frequency. By setting the weighting factors to a first configuration, as in FIGS. 8A-8C, most of the signal power is within the bandwidth of the filter. By setting the weighting factors to a second configuration, as in FIGS. 8D-8F, an appreciable amount of the signal is degraded by the channel filter (i.e., there is relatively high insertion loss). However, using the first configuration also produces appreciably higher total ISI than that of the second configuration, which can manifest as an appreciable SNR (power) penalty at the receiver. For example, as long as the matched filter can tolerate the relatively high power penalty, the first configuration may be used for the NNPR filtering, as it provides higher throughput. However, if the power penalty is determined to be too high, the second configuration (or a different configuration) can be selected.

Figure 10A:
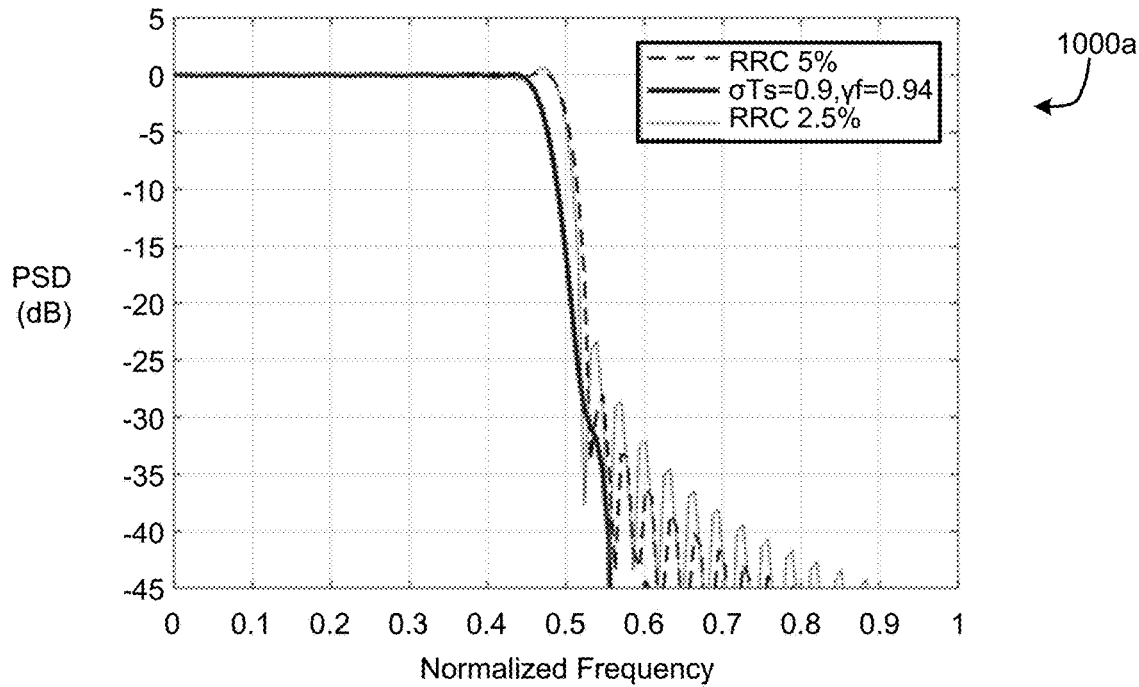
FIGS. 10A and 10B show plots comparing power spectral density (PSD) and peak-to-average-power ratio (PAPR) between an illustrative NNPR filter and two different conventional RRC filters.
Figure 10B:
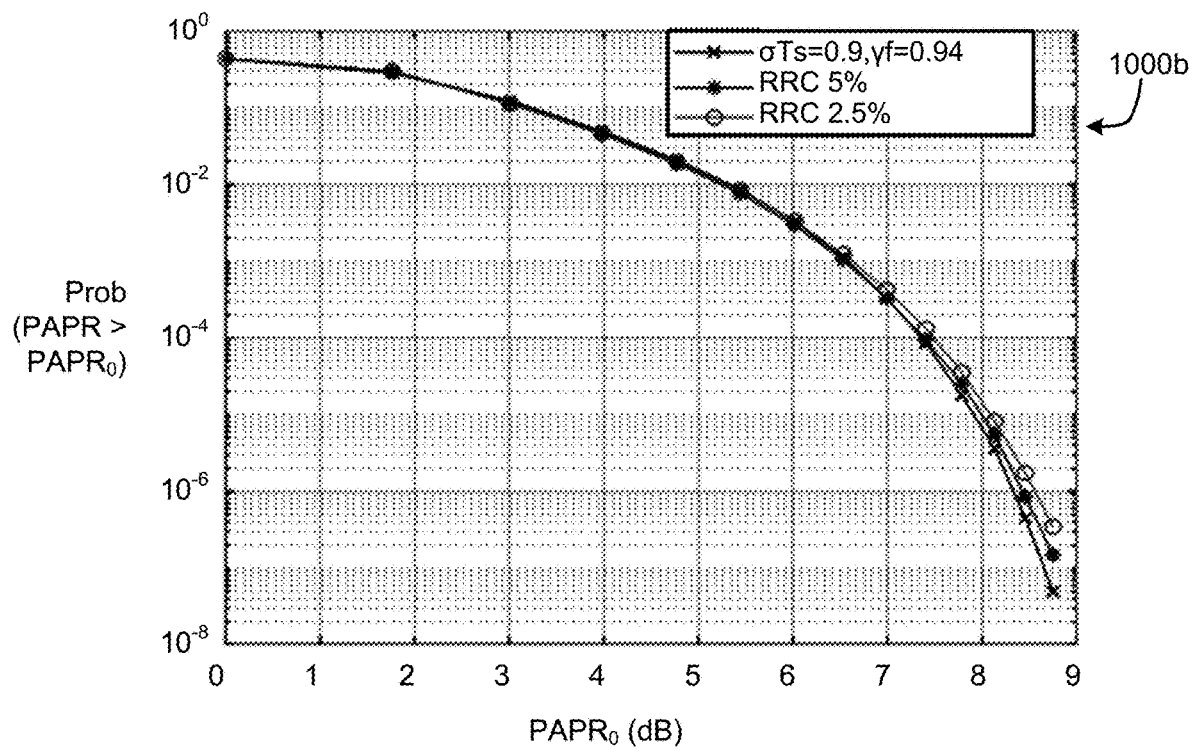

FIGS. 10A and 10B show plots 1000 comparing power spectral density (PSD) and peak-to-average-power ratio (PAPR) between an illustrative NNPR filter and two different conventional RRC filters. In particular, the illustrative NNPR filter has weighting factors set, so that $\sigma T_s=0.9$ and $\gamma_f(k)=0.94$; k=±1; a first of the conventional RRC filters is configured with a roll-off of 0.05; and a second of the conventional RRC filters is configured with a roll-off of 0.025. Each of the plots 1000 was generated by using a same number of taps on each of the filters to generate its respective impulse response.

The plots 1000 demonstrates that the novel NNPR-based filter approach described herein can provide better spectral properties thank those of even state-of-the-art RRC filters. For example, FIG. 10A shows that the NNPR filter results in a more compact main lobe and smaller side-lobes than those of both RRC filters, and FIG. 10B shows that the NNPR filter results in a lower PAPR than that of both RRC filters. However, the ISI power at the matched filter (not shown in FIG. 10A or 10B) is appreciably higher for this configuration of NNPR filter than for both of the RRC filters. Specifically, the NNPR filter produces approximately −13.5 dB of total ISI power (see FIG. 8C), while the total ISI power is only −36 dB for the RRC filter with roll-off of 0.05, and only −27 dB for the RRC filter with roll-off of 0.025.

Features of the NNPR-based filtering described herein can be realized in both forward-link and return-link directions of a wireless communication system. In the forward link (e.g., in a satellite forward link from a satellite gateway system to a user terminal via a relay satellite), NNPR filters can provide control over trade-offs between bandwidth efficiency and performance in context of increasing throughput or spectral efficiency of the link. If channel bandwidth is fixed (e.g., 40 MHz), increase the throughput can be accomplished by increasing symbol rate for a given choice of modulation and FEC code rate (MODCOD). As described above, NNPR filters can manifest a more compact spectrum than conventional RRC filters, such that NNPR filters can be used to signal at higher symbol rates for a fixed channel bandwidth. Additionally, as described herein, setting the values of $\sigma T_s$ and $\gamma_f(k)$ can provide parametric control over the trade-off between spectral compactness (corresponding to throughput) and ISI power at the receiver (corresponding to SNR).

Figure 11:
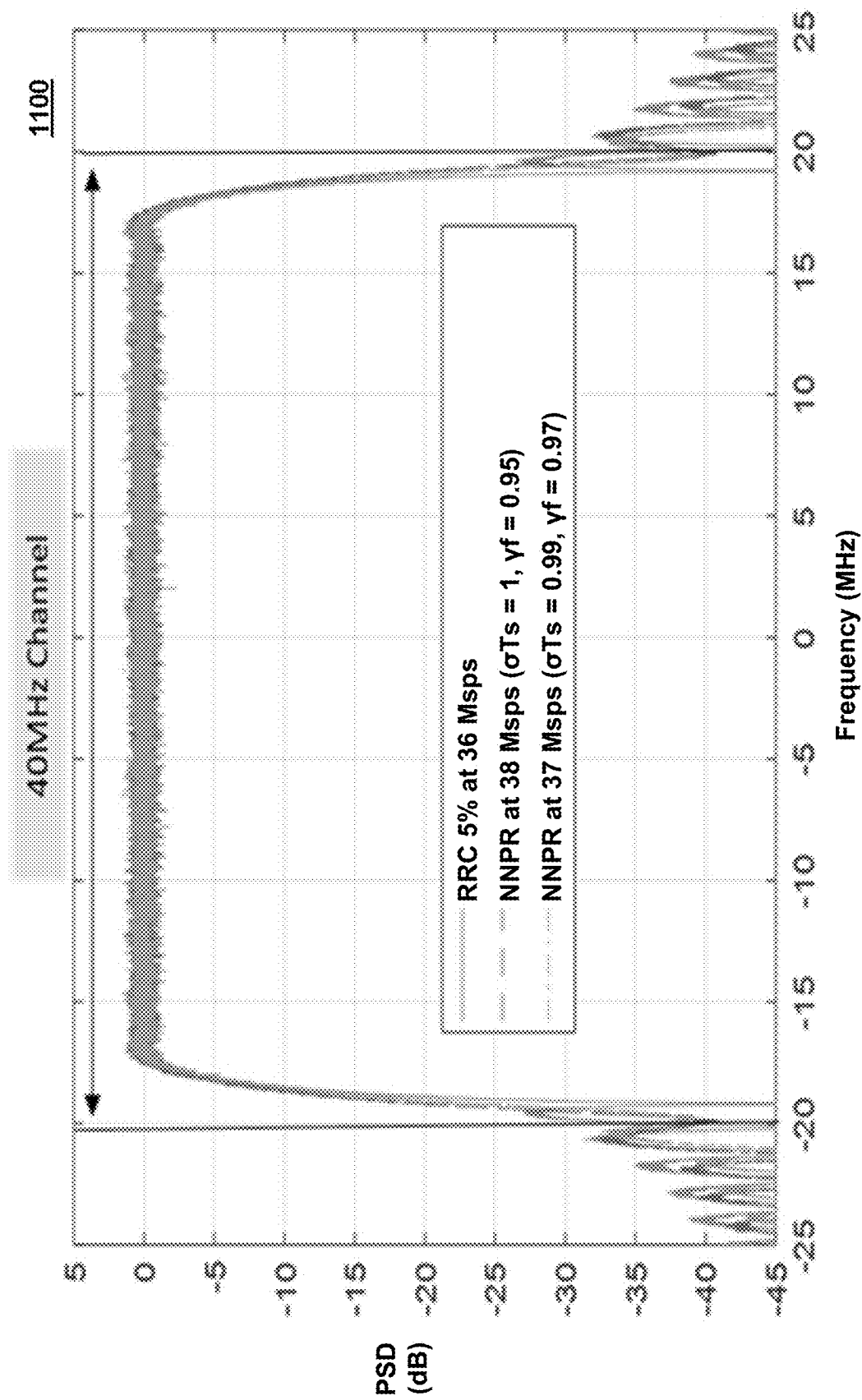
FIG. 11 shows a color plot comparing power spectral density (PSD) over a range of frequencies in a 40-Megahertz fixed-bandwidth channel for a conventional RRC filter and two illustrative implementations of NNPR filters.
Figure 12:
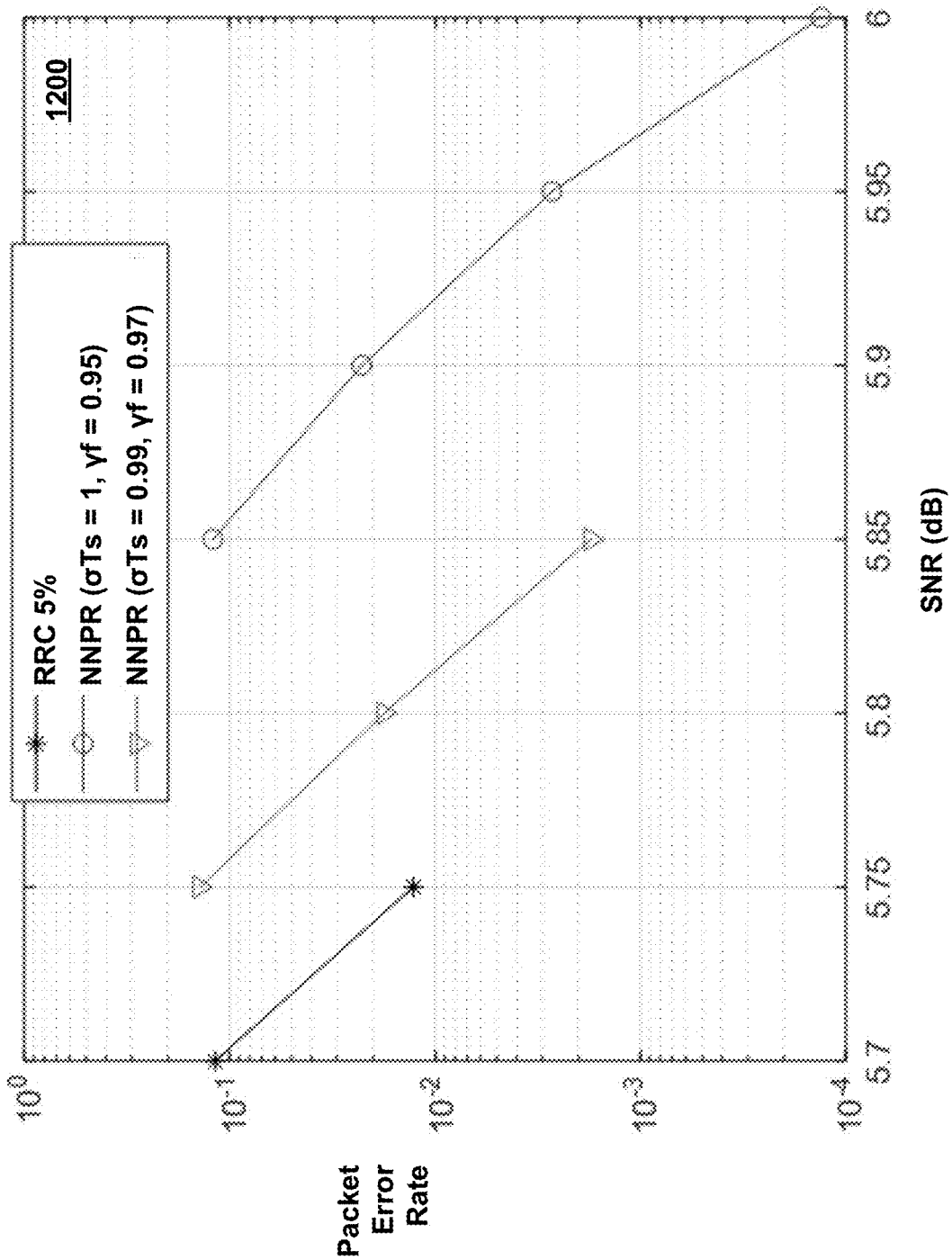
FIG. 12 shows a plot comparing packet error rate over a range of SNR values for the same conventional RRC filter and two illustrative implementations of NNPR filters evaluated in FIG. 11.

An example of such a trade-off is demonstrated in FIGS. 11 and 12. FIG. 11 shows a plot 1100 comparing power spectral density (PSD) over a range of frequencies in a 40-Megahertz fixed-bandwidth channel for a conventional RRC filter and two illustrative implementations of NNPR filters. The plot 1100 indicates that an RRC filter with a 5-percent roll-off can signal at 36 Mega-samples per second (Msps) without generally exceeding the allocated bandwidth. A first NNPR filter implementation is configured with $\sigma T_s=0.99$ and $\gamma_f(k)=0.97$; $k=\pm 1$; and a second NNPR filter implementation is configured with $\sigma T_s=1$ and $\gamma_f(k)=0.95$; $k=\pm 1$. The plot 1100 indicates that the first NNPR filter implementation can be used to signal at up to 37 Msps in substantially the same spectrum width as used by the RRC filter to signal at only 36 Msps, and the first NNPR filter implementation also decays faster than the RRC filter. This translates to the first NNPR filter implementation yielding approximately a 2.8-percent increase in throughput over that of the RRC filter. The second NNPR filter implementation provides an even further increase in throughput. In particular, the plot 1100 indicates that the second NNPR filter implementation can be used to signal at up to 38 Msps in substantially the same spectrum width as used by the RRC filter to signal at only 36 Msps, and the second NNPR filter implementation decays faster than both the RRC filter and the first NNPR filter implementation. This translates to the second NNPR filter implementation yielding approximately a 5.5-percent increase in throughput over that of the RRC filter.

FIG. 12 shows a plot 1200 comparing packet error rate over a range of SNR values for the same conventional RRC filter and two illustrative implementations of NNPR filters evaluated in FIG. 11. As described herein, unlike conventional Nyquist-based filters, such as RRC filters, novel NNPR-based filtering approaches introduce ISI. The added ISI can manifest as a power or SNR penalty in the packet error rate performance, as evidenced in plot 1200. Plot 1200 assumes a MODCOD of 16-APSK rate 1/2. By evaluating FIGS. 11 and 12 together, it can be seen that the 2.8-percent throughput increase provided by the second NNPR filter implementation (as compared to a conventional RRC filter with 5-percent roll-off) is accompanied by approximately a 0.5 dB penalty in SNR, and the 5.5-percent throughput increase provided by the second NNPR filter implementation is accompanied by approximately a 1.5 dB penalty in SNR.

In context of a return-link of a wireless communication system, such as a satellite return link, filter design and/or configuration can impact bit error rate (BER) performance, such as when multiple carriers simultaneously access the channel. To minimize adjacent channel interference (ACI), systems can tend to space apart adjacent carriers by an amount that accounts for the compactness of the spectrum, such as based on roll-off. For example, systems employing RRC filters will tend to space adjacent carriers at $\Delta_f \geq R_s(1+\alpha)$ Hz. Due to their more compact frequency spectrum, NNPR-based filtering approaches described herein can permit adjacent carriers to be packed closer together without causing additional ACI. This can result in improved spectral efficiency.

Figure 13:
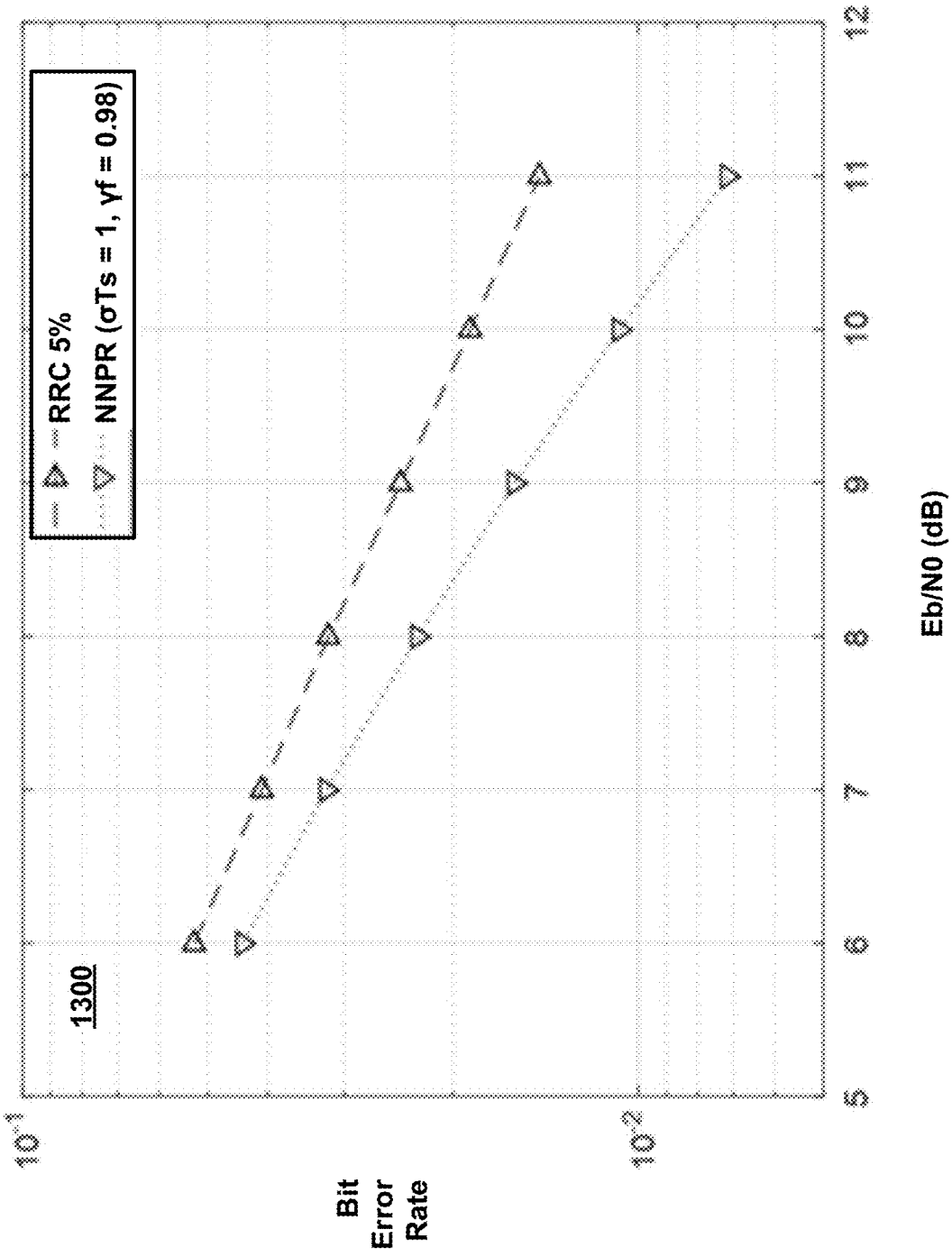
FIG. 13 shows a plot of bit error rate of a 16-APSK signal in the presence of four adjacent carriers (two on either side) that are all 3 dB stronger than the desired carrier and with an adjacent carrier spacing of $\Delta_f = R_s$.

FIG. 13 shows a plot 1300 of bit error rate of a 16-APSK signal in the presence of four adjacent carriers (two on either side) that are all 3 dB stronger than the desired carrier and with an adjacent carrier spacing of $\Delta_f=R_s$. The plot 1300 compares performance in that environment between an RRC filter with roll-off 0.05 and an implementation of a NNPR filter with $\sigma T_s=1.0$ and $\gamma_f(\pm 1)=0.98$. The RRC filter relies on an adjacent channel spacing of at least $\Delta_f=R_s(1.05)$ Hz, while the NNPR filter relies on an adjacent channel spacing of only $\Delta_f=R_s$ Hz; a 5% improvement in system spectral efficiency.

A conventional receiver is assumed that generates symbol hard decisions using the matched filter output without utilizing ISI or ACI mitigation. The BER results indicate that in addition to improving the spectral efficiency by 5%, NNPR filter approaches provide appreciable improvements in error rate performance relative to state-of-the art RRC filters, also at $\Delta_f=R_s$. These improvements are facilitated by the NNPR filter's ability to better shape the spectrum and to better control the ISI as experienced at the receiver.

Figure 14A:
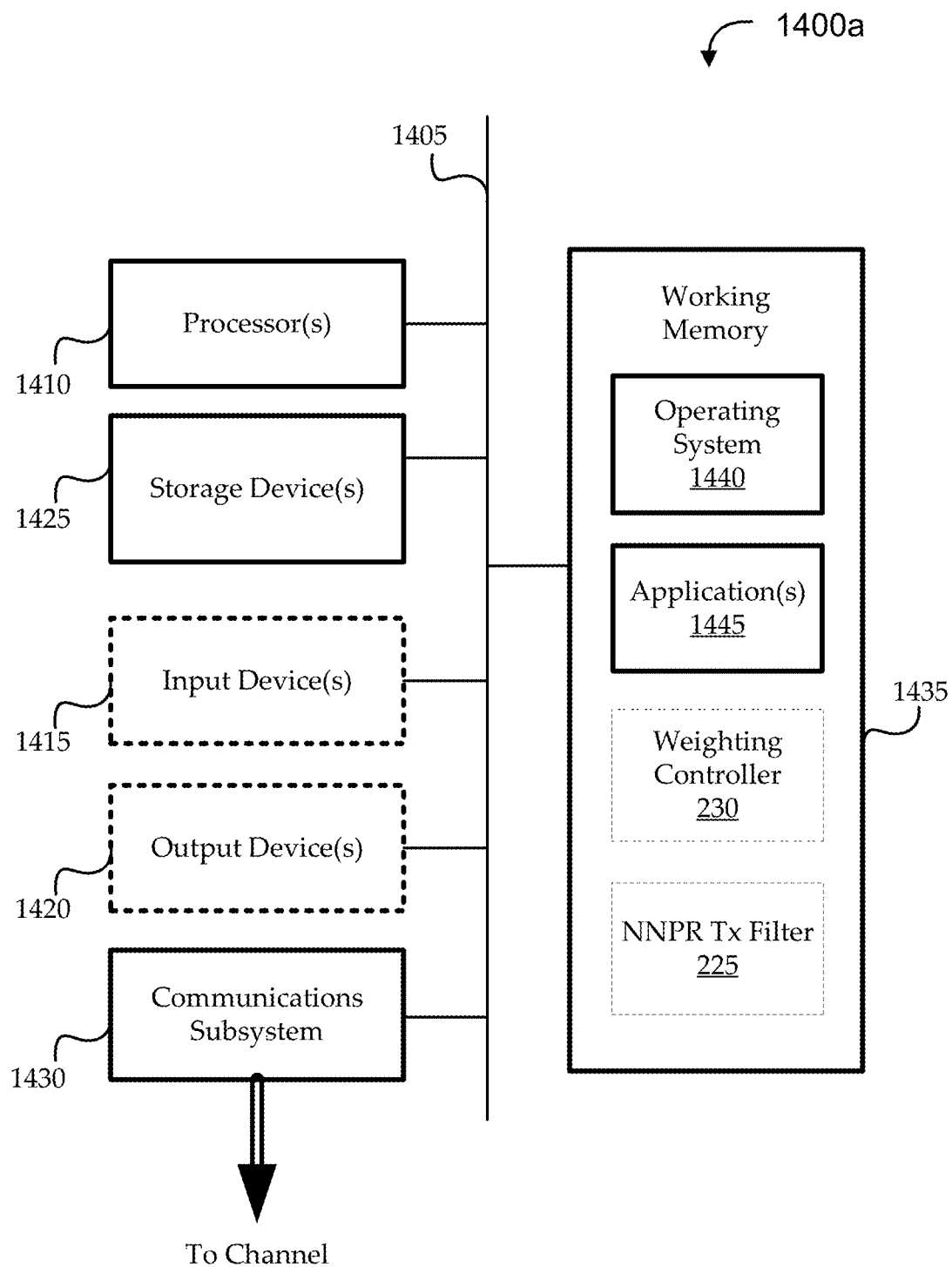
FIGS. 14A and 14B provide a schematic illustrations of embodiments of a computational system that can implement various system components and/or perform various steps of methods provided by various embodiments.
Figure 14B:
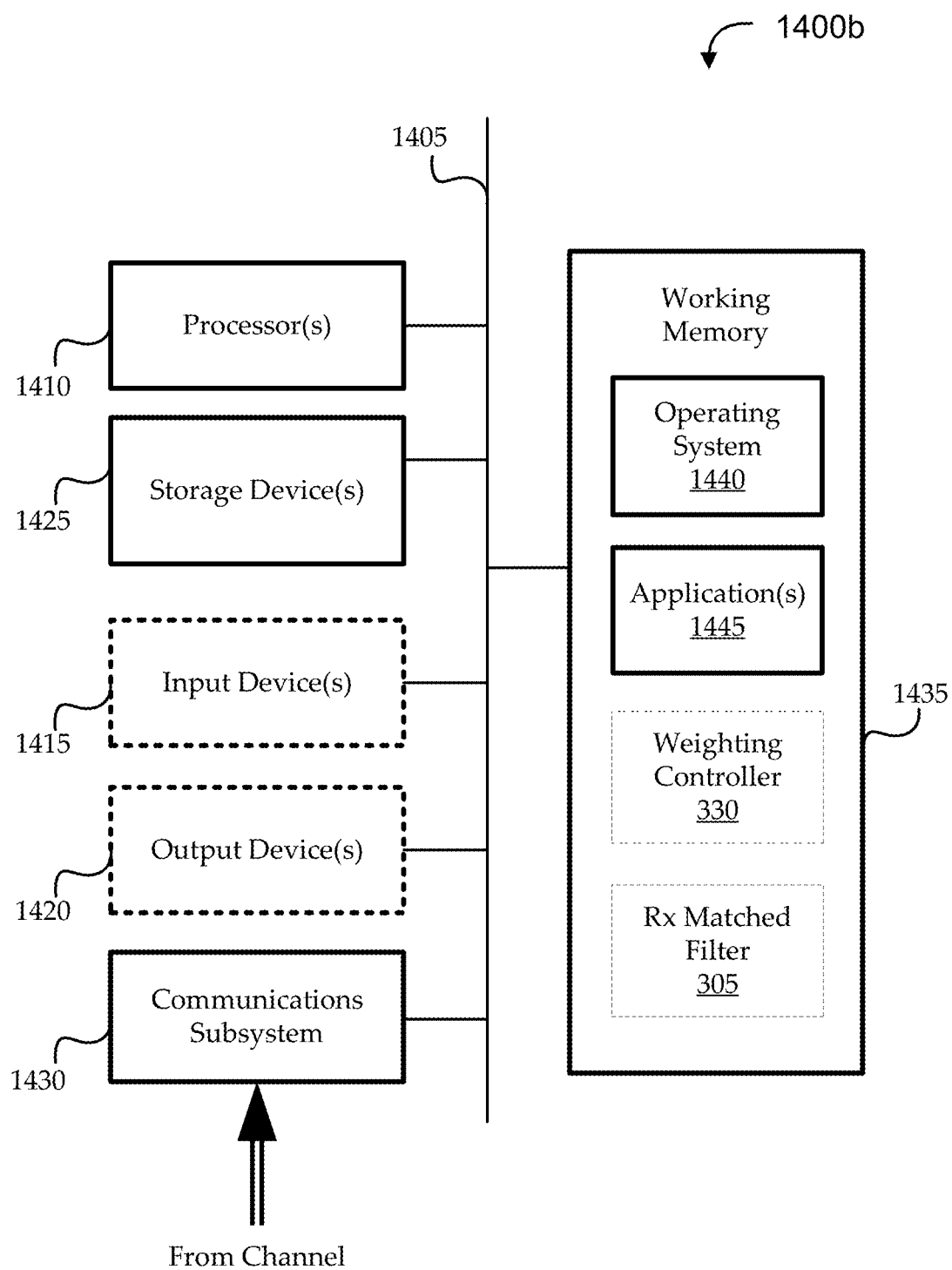

In some embodiments, components of some or all of the transmitter 200 and/or the receiver 300 can be implemented in a computational environment. FIGS. 14A and 14B provide a schematic illustrations of embodiments of a computational system 1400 that can implement various system components and/or perform various steps of methods provided by various embodiments. The computational system 1400a of FIG. 14A represents an illustrative implementation of a transmitter, such as the transmitter 200 of FIG. 2. The computational system 1400b of FIG. 14B represents an illustrative implementation of a receiver, such as the receiver 300 of FIG. 3. It should be noted that FIGS. 14A and 14B are meant only to provide a generalized illustration of various components, any or all of which may be utilized as appropriate. FIGS. 14A and 14B, therefore, broadly illustrate how individual system elements may be implemented in a relatively separated or relatively more integrated manner.

The computational system 1400 is shown including hardware elements that can be electrically coupled via a bus 1405 (or may otherwise be in communication, as appropriate).

The hardware elements may include one or more processors 1410, including, without limitation, one or more general-purpose processors and/or one or more special-purpose processors (such as digital signal processing chips, graphics acceleration processors, video decoders, and/or the like). Optionally, embodiments of the computational system 1400 can include one or more input devices 1415, and/or one or more output devices 1420. The input devices 1415 can include user input devices (e.g., a mouse, a keyboard, remote control, touchscreen interfaces, audio interfaces, video interfaces, and/or the like) and/or machine input devices (e.g., computer-to-computer interfaces, such as wired and/or wireless input data ports). Similarly, the output devices 1420 can include user output devices (e.g., display devices, printers, and/or the like), and/or machine input devices (e.g., computer-to-computer interfaces, such as wired and/or wireless output data ports).

The computational system 1400 may further include (and/or be in communication with) one or more non-transitory storage devices 1425, which can comprise, without limitation, local and/or network accessible storage, and/or can include, without limitation, a disk drive, a drive array, an optical storage device, a solid-state storage device, such as a random-access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 1425 include memory for storing weighting factors, wireless channel models, and/or other information used by embodiments to implement features described herein. The computational system 1400 can also include a communications subsystem 1430, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. As illustrated, the communications subsystem 1430 in FIG. 14A can include any suitable hardware and/or software components for transmitting to a wireless channel (e.g., amplifiers, antennas, etc.); and the communications subsystem 1430 in FIG. 14B can include any suitable hardware and/or software components for receiving from the wireless channel (e.g., amplifiers, antennas, etc.).

In many embodiments, the computational system 1400 will further include a working memory 1435, which can include a RAM or ROM device, as described herein. The computational system 1400 also can include software elements, shown as currently being located within the working memory 1435, including an operating system 1440, device drivers, executable libraries, and/or other code, such as one or more application programs 1445, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general-purpose computer (or other device) to perform one or more operations in accordance with the described methods.

In some embodiments represented by FIG. 14A, the operating system 1440 and the working memory 1435 are used in conjunction with the one or more processors 1410 to implement some or all of the NNPR transmit filter 225 and the transmitter weighting controller 230. Some such embodiments can further implement one or more additional components of the transmitter 200, such as transmitter front-end components. In some embodiments represented by FIG. 14B, the operating system 1440 and the working memory 1435 are used in conjunction with the one or more processors 1410 to implement some or all of the receiver matched filter 305 and the receiver weighting controller 330. Some such embodiments can further implement one or more additional components of the receiver 300, such as receiver back-end components.

A set of these instructions and/or codes can be stored on a non-transitory (or non-transient) computer-readable storage medium, such as the non-transitory storage device(s) 1425 described above. In some cases, the storage medium can be incorporated within a computer system, such as computational system 1400. In other embodiments, the storage medium can be separate from a computer system (e.g., a removable medium, such as a compact disc), and/or provided in an installation package, such that the storage medium can be used to program, configure, and/or adapt a general-purpose computer with the instructions/code stored thereon. These instructions can take the form of executable code, which is executable by the computational system 1400 and/or can take the form of source and/or installable code, which, upon compilation and/or installation on the computational system 1400 (e.g., using any of a variety of generally available compilers, installation programs, compression/decompression utilities, etc.), then takes the form of executable code.

In some embodiments, the computational system 1400 implements a portion of a system for communicating a data signal in a wireless communication network, as described herein. The non-transitory storage device(s) 1425 can have instructions stored thereon, which, when executed, cause the processor(s) 1410 to convert a stream of information bits to a sequence of symbols; modulate the sequence of symbols onto the data signal by the transmitter; and pulse-shape, by the NNPR transmit filter 225, the data signal with a non-Nyquist pulse-shaping waveform to generate a pulse-shaped signal. In such embodiments, the non-Nyquist pulse-shaping waveform can be generated by: weighting a non-Nyquist waveform as a function of a first tunable weighting factor to generate a weighted non-Nyquist waveform; and generating the non-Nyquist pulse-shaping waveform by applying weighted orthogonalization to the weighted non-Nyquist waveform as a function of a second tunable weighting factor, the second tunable weighting factor controlling a non-zero amount of inter-symbol interference ISI in the non-Nyquist pulse-shaping waveform. In some implementations, the instructions can further cause the processor(s) 1410 to set the first and second tunable weighting factors by the transmitter weighting controller 230. The instructions can further cause the processor(s) 1410 to direct the communications subsystem 1430 to transmit the pulse-shaped signal over the wireless channel of the wireless communication system.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computational system 1400) to perform methods in accordance with various embodiments of the invention. According to a set of embodiments, some or all of the procedures of such methods are performed by the computational system 1400 in response to processor 1410 executing one or more sequences of one or more instructions (which can be incorporated into the operating system 1440 and/or other code, such as an application program 1445) contained in the working memory 1435. Such instructions may be read into the working memory 1435 from another computer-readable medium, such as one or more of the non-transitory storage device(s) 1425. Merely by way of example, execution of the sequences of instructions contained in the working memory 1435 can cause the processor(s) 1410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computational system 1400, various computer-readable media can be involved in providing instructions/code to processor(s) 1410 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1425. Volatile media include, without limitation, dynamic memory, such as the working memory 1435. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1410 for execution. Merely by way of example, the instructions may initially be carried on a disk of a remote computer. The remote computer can load the instructions into its dynamic memory and send the instructions as signals over a transmission medium to be received and/or executed by the computational system 1400. The communications subsystem 1430 (and/or components thereof) generally will receive signals, and the bus 1405 then can carry the signals (and/or the data, instructions, etc., carried by the signals) to the working memory 1435, from which the processor(s) 1410 retrieves and executes the instructions. The instructions received by the working memory 1435 may optionally be stored on a non-transitory storage device 1425 either before or after execution by the processor(s) 1410.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for communicating a data signal in a wireless communication network, the system comprising:
   a transmitter to transmit a pulse-shaped signal over a wireless channel of the wireless communication network, the transmitter having:
      a front-end configured to convert a stream of information bits to a sequence of symbols and to modulate the sequence of symbols onto the data signal; and
      a non-Nyquist partial response (NNPR) filter configured to pulse-shape the data signal with a non-Nyquist pulse-shaping waveform to generate the pulse-shaped signal,
      wherein the non-Nyquist pulse-shaping waveform is generated by weighting a non-Nyquist waveform as a function of a first tunable weighting factor to generate a weighted non-Nyquist waveform, and
      wherein the non-Nyquist pulse-shaping waveform is generated by applying weighted orthogonalization to the weighted non-Nyquist waveform as a function of a second tunable weighting factor, the second tunable weighting factor controlling a non-zero amount of inter-symbol interference (ISI) in the non-Nyquist pulse-shaping waveform; and
   a receiver to receive the pulse-shaped signal via the wireless channel, the receiver having:
      a matched filter configured to filtering the received pulse-shaped signal in accordance with pulse-shaping by the NNPR filter.

2. The system of claim 1, wherein:
the wireless channel is associated with a target throughput characteristic and a target power penalty characteristic; and
   the first tunable weighting factor and the second tunable weighting factor are set, such that the non-Nyquist pulse-shaping waveform is generated to yield a throughput at least meeting the target throughput characteristic accompanied by a power penalty at least meeting the target power penalty characteristic.

3. The system of claim 1, wherein:
the matched filter outputs a sequence of symbol samples based on sampling the received pulse-shaped signal; and
the receiver further has a back-end to soft-convert the symbol samples to bit probabilities, and to de-interleave and decode the bit probabilities to obtain a stream of estimated bits corresponding to the stream of information bits.

4. The system of claim 1, wherein:
the NNPR filter is configured to have a frequency response of $$\phi_{NNPR}(f) = S_G(f) / \left[ \sum_{k \in \mathbb{Z}} \left| S_G\left(f + \frac{k \cdot \gamma_f(k)}{T_s}\right) \right|^2 \right]^{1/2};$$

the weighted non-Nyquist waveform has a frequency response of $$S_G(f) = e^{-((2\pi f)^2 (\sigma T_s)^2)};$$

$\sigma T_s$ is the first tunable weighting factor; and
$\gamma_f(k)$ is the second tunable weighting factor.

5. The system of claim 4, wherein:
the wireless channel is associated with a target impulse response characteristic; and
the first tunable weighting factor and the second tunable weighting factor are set, such that the non-Nyquist pulse-shaping waveform is generated to yield an impulse response, $p_{NNPR,T}(t)$, that at least meets the target impulse response characteristic and has a frequency-to-time-domain conversion of $\phi_{NNPR}(f)$.

6. The system of claim 1, wherein the front-end comprises:
a forward error correction (FEC) block to apply a coding scheme to the stream of information bits to generate codebits;
an interleaver block to interleave the codebits to generate interleaved codebits;
a bit to symbol mapper block to map the interleaved codebits onto a two-dimensional signal constellation to generate constellation points, and to select from the constellation points a sequence of complex-value symbols; and
a modulator block to modulate the sequence of symbols onto the data signal.

7. The system of claim 1, wherein:
the transmitter is disposed in a satellite gateway system;
the wireless channel communicatively couples the satellite gateway system with one or more user terminals via a relay satellite, the relay satellite manifesting a channel impulse response for the wireless channel; and
the first tunable weighting factor and the second tunable weighting factor are set, based on the channel impulse response, to maximize a throughput over the wireless channel at a given power penalty, and/or to minimize a power penalty at a given throughput over the wireless channel.

8. The system of claim 7, wherein the first tunable weighting factor and the second tunable weighting factor are set, based on the channel impulse response:
to maximize a throughput over the wireless channel at a given power penalty, and/or to minimize a power penalty at a given throughput over the wireless channel for forward-link communications over the wireless channel; and
further to minimize adjacent channel interference for return-link communications over the wireless channel.

9. A method for communicating a signal in a wireless communication network, the method comprising:
converting a stream of information bits to a sequence of symbols by a transmitter;
modulating the sequence of symbols onto a data signal by the transmitter;
obtaining a target throughput characteristic and a target power penalty characteristic for the wireless channel;
pulse-shaping, by a non-Nyquist partial response (NNPR) filter of the transmitter, the data signal with a non-Nyquist pulse-shaping waveform to generate a pulse-shaped signal, the non-Nyquist pulse-shaping waveform generated by:
weighting a non-Nyquist waveform as a function of a first tunable weighting factor to generate a weighted non-Nyquist waveform; and
generating the non-Nyquist pulse-shaping waveform by applying weighted orthogonalization to the weighted non-Nyquist waveform as a function of a second tunable weighting factor, the second tunable weighting factor controlling a non-zero amount of inter-symbol interference (ISI) in the non-Nyquist pulse-shaping waveform, wherein:
the first tunable weighting factor and the second tunable weighting factor are set such that the non-Nyquist pulse-shaping waveform is generated to yield a throughput at least meeting the target throughput characteristic accompanied by a power penalty at least meeting the target power penalty characteristic; and
transmitting the pulse-shaped baseband signal by the transmitter over a wireless channel of the wireless communication network.

10. The method of claim 9, wherein:
the target throughput characteristic corresponds to a target power spectral density; and
the target power penalty characteristic corresponds to one or more of a target signal to noise ratio, a target inter-symbol interference power, or a target adjacent channel interference power.

11. The method of claim 9, further comprising:
receiving the pulse-shaped baseband signal by a receiver via the wireless channel; and
filtering the received pulse-shaped signal by a matched filter of the receiver configured to match the pulse-shaping by the NNPR filter.

12. The method of claim 11, further comprising:
sampling the received pulse-shaped signal at an output of the matched filter to generate symbol samples; and
soft-converting the symbol samples into bit probabilities, and de-interleaving and decoding the bit probabilities to obtain a stream of estimated bits corresponding to the stream of information bits.

13. The method of claim 9, wherein:
the weighted non-Nyquist waveform is a Gaussian waveform having a frequency response, $$S_G(f) = e^{-((2\pi f)^2(\sigma T_s)^2)},$$

wherein $\sigma T_s$ is the first tunable weighting factor; and
the applying weighted orthogonalization to the weighted non-Nyquist waveform as a function of a second tunable weighting factor generates the non-Nyquist pulse-shaping waveform to have a frequency response, $$\phi_{NNPR}(f) = S_G(f) / \left[ \sum_{k \in \mathbb{Z}} \left| S_G\left(f + \frac{k \cdot \gamma_f(k)}{T_s}\right) \right|^2 \right]^{1/2},$$

wherein $\gamma_f(k)$ is the second tunable weighting factor.

14. The method of claim 13, further comprising, prior to the pulse-shaping:
obtaining a target impulse response characteristic for the wireless channel; and
setting the first tunable weighting factor and the second tunable weighting factor, such that the non-Nyquist pulse-shaping waveform is generated to yield an impulse response, $p_{NNPR,T}(t)$, that at least meets the target impulse response characteristic and has a frequency-to-time-domain conversion of $\phi_{NNPR}(f)$.

15. The method of claim 9, wherein the converting the stream of information bits to the sequence of symbols comprises:

applying a coding scheme to the stream of information bits to generate codebits;

interleaving the codebits to generate interleaved codebits;

mapping the interleaved codebits onto a two-dimensional signal constellation to generate constellation points; and selecting from the constellation points to generate the sequence of symbols as a sequence of complex-value symbols.

16. The method of claim 9, wherein:

the transmitter is disposed in a satellite gateway system; and the wireless channel communicatively couples the satellite gateway system with one or more user terminals via a relay satellite, the relay satellite manifesting a channel impulse response for the wireless channel; and the first tunable weighting factor and the second tunable weighting factor are set, based on the channel impulse response, to maximize a throughput over the wireless channel at a given power penalty, and/or to minimize a power penalty at a given throughput over the wireless channel.

17. The method of claim 16, wherein the first tunable weighting factor and the second tunable weighting factor are set, based on the channel impulse response:

to maximize a throughput over the wireless channel at a given power penalty, and/or to minimize a power penalty at a given throughput over the wireless channel for forward-link communications over the wireless channel; and further to minimize adjacent channel interference for return-link communications over the wireless channel.

18. A computational system comprising:

a set of processors;

a non-transitory memory having instructions stored thereon, which, when executed, cause the set of processors to perform steps comprising:

converting a stream of information bits to a sequence of symbols by a transmitter;

modulating the sequence of symbols onto a data signal by the transmitter; and pulse-shaping, by a non-Nyquist partial response (NNPR) filter of the transmitter, the data signal with a non-Nyquist pulse-shaping waveform to generate a pulse-shaped signal, the non-Nyquist pulse-shaping waveform generated by:

weighting a non-Nyquist waveform as a function of a first tunable weighting factor to generate a weighted non-Nyquist waveform; and generating the non-Nyquist pulse-shaping waveform by applying weighted orthogonalization to the weighted non-Nyquist waveform as a function of a second tunable weighting factor, the second tunable weighting factor controlling a non-zero amount of inter-symbol interference ISI in the non-Nyquist pulse-shaping waveform wherein the first tunable weighting factor and the second tunable weighting factor are set, based on the channel impulse response:

to increase a throughput over a wireless channel at a given power penalty, and/or to minimize a power penalty at a given throughput over the wireless channel for forward-link communications over the wireless channel; and to decrease adjacent channel interference for return-link communications over the wireless channel.

* * * * *